(12) United States Patent
Youssefzadeh et al.

(10) Patent No.: US 8,032,073 B2
(45) Date of Patent: Oct. 4, 2011

(54) SATELLITE COMMUNICATION WITH MULTIPLE ACTIVE GATEWAYS

(75) Inventors: Emil Youssefzadeh, Palos Verdes Estates, CA (US); Hans Peter Lexow, Oslo (NO); Richard R. Forberg, Windham, NH (US)

(73) Assignee: STM Networks, Inc., Irvine, CA (US)

( * ) Notice: Subject to any disclaimer, the term of this patent is extended or adjusted under 35 U.S.C. 154(b) by 1040 days.

(21) Appl. No.: 11/800,299

(22) Filed: May 3, 2007

(65) Prior Publication Data
US 2008/0043663 A1 Feb. 21, 2008

Related U.S. Application Data

(60) Provisional application No. 60/746,356, filed on May 3, 2006.

(51) Int. Cl.
*H04H 20/74* (2008.01)
(52) U.S. Cl. ........ 455/3.02; 455/427; 455/12.1; 455/98; 370/316; 370/321
(58) Field of Classification Search .............. 455/3.02, 455/427, 21.1, 98, 12.1; 370/316, 321
See application file for complete search history.

(56) References Cited

U.S. PATENT DOCUMENTS

| | | | | |
|---|---|---|---|---|
| 5,640,386 A | * | 6/1997 | Wiedeman | 370/320 |
| 2002/0105976 A1 | * | 8/2002 | Kelly et al. | 370/519 |

* cited by examiner

*Primary Examiner* — Mathew D. Anderson
*Assistant Examiner* — Shaima Q Aminzay
(74) *Attorney, Agent, or Firm* — Ataullah Arjomand

(57) ABSTRACT

Methods and apparatus are disclosed to enable a fixed or a mobile ground based slave stations (VSAT: Very Small Aperture Terminal) in a communication network to receive TDM transmissions from and transmit TDMA burst transmissions to one or more ground-based gateway stations in a networking system that employs one or more geosynchronous satellites. Each gateway station transmits on one or more forward TDM channels to the slave stations; however, one primary gateway acts as the master station at any given time which transmits the network control messages to the slave stations (VSATs) that control their TDMA transmission behavior on the network.

3 Claims, 14 Drawing Sheets

A Typical Master (Primary Gateway) Station

A Secondary Gateway Station

A Typical Slave (VSAT) Station

A Slave (VSAT) Station With Multiple TDM Receivers

A Slave (VSAT) Station for Mesh Networking With Multiple TDM Receivers

Logical Layer Processing at a Slave (VSAT) Station with one TDM Receiver

Logical Layer Processing at a Slave (VSAT) Station with Two TDM Receivers

Logical Layer Processing at a Slave (VSAT) Station with Mesh Networking with Two TDM Receivers A Secondary Gateway Station Enhanced with
Multiple TDM Receivers

SATELLITE COMMUNICATION WITH MULTIPLE ACTIVE GATEWAYS

CROSS-REFERENCE TO RELATED APPLICATION(S)

This application claims the benefit of U.S. Provisional Patent Application No. 60/746,356, filed on May 3, 2006.

TECHNICAL FIELD

Disclosed embodiments relate, in general, to satellite communication systems and, in particular, to TDM channel reception from a master station (or "gateway" or "hub") by a ground based slave station (VSAT), and TDMA or MF-TDMA methods for return channel communication from a ground based slave station (VSAT) to a master station or to another type of gateway station or hub or to another slave station.

BACKGROUND

Satellite networking systems supporting two-way communications that have one active ground station functioning as the master station and a plurality of widely distributed slave stations are very common today. These slave stations are often called "VSATs"—Very Small Aperture Terminals—or simply "terminals." There are international standards defining how such VSAT networks should be built and operated. The most comprehensive and widely adopted standard is the DVB-RCS standard which is a family of DVB (Direct Video Broadcast) standards developed by the DVB Project and published by the European Technical Standards Institute (ETSI). See ETSI EN 301 790 and www.etsi.org.

The DVB-RCS standard utilizes TDM (Time Division Multiplexing) on the forward channel to the VSATs, and MF-TDMA (Multi-Frequency Time Division Multiple Access) techniques on the return channels to the master station. Most such VSAT networks today—even those not based on the DVB-RCS standard—use TDM and MF-TDMA techniques in a similar way as described in the DVB-RCS standard, though particular details of their implementations may differ. Some older technology VSAT networks may still use a single return channel (at a single carrier frequency) and, therefore, only employ TDMA.

The embodiments disclosed herein apply to any type of VSAT network that utilizes TDM communications from the master station and either MF-TDMA or simply TDMA techniques on the return channel communications to the master station in what forms a star topology network with the master at the hub. They also apply to situations where slave stations or VSATs may be able to communicate to each other directly by using TDMA communications on one or more assigned channels, in what forms a mesh topology network among the slave stations, which is overlaid on a star-topology network. Both situations are common today. However, these embodiments are mere examples and do not limit the invention to these specific communication types.

VSAT networks are used for providing two-way data, voice, and/or video communication between one major location, such as near a metropolitan area or an Internet backbone site, and a variety of more remote locations, such as small businesses or homes in suburban or rural areas or entire villages or towns in remote areas of some countries. Such networks are particularly useful in areas where the terrestrial telecommunication infrastructures are less developed than those commonly found in major cities of well developed countries. They are also useful as a low-cost competitive alternative to many terrestrial services.

Today, because all VSAT network technologies only allow one active master station, their flexibility is limited. The master station usually also functions as the "gateway" between the VSAT slave stations, which are often isolated, and the rest of world's telecommunications infrastructure. (A master station or a gateway station sometimes is also called a "hub station" because of its role as the hub of a star topology network.) Therefore, a desired enhancement to VSAT networking technology of all types is to allow communication with multiple gateways with any VSAT station of the network. Such multi-gateway enhancement has applications and advantages of the following general nature:

a.) A data communication VSAT network, using the Internet Protocol (IP) or other data protocols, can direct traffic targeted for a first data processing center to a first gateway and traffic targeted for a second data processing center to a second gateway.

b.) A voice communication VSAT network, such as Voice over IP or via other means, can direct all calls within the country to a first gateway and all calls to international destinations to a second gateway.

c.) In case of the failure or destruction of a first gateway station a second gateway in the network, distant from the first, can (dynamically, automatically, and/or based on a pre-defined routing procedure, etc.) may be able to take over the role of master and provide additional reliability not available in current VSAT networks.

However, special considerations are required to enable the slave station (VSAT) to receive TDM transmission from multiple gateways and to send TDMA transmission to multiple distinct gateways. That is because the gateway station—as noted earlier—also acts as the master station for the entire VSAT network and it is not possible for a VSAT network to have two or more master stations operating concurrently.

DETAILED DESCRIPTION

Figure 1:
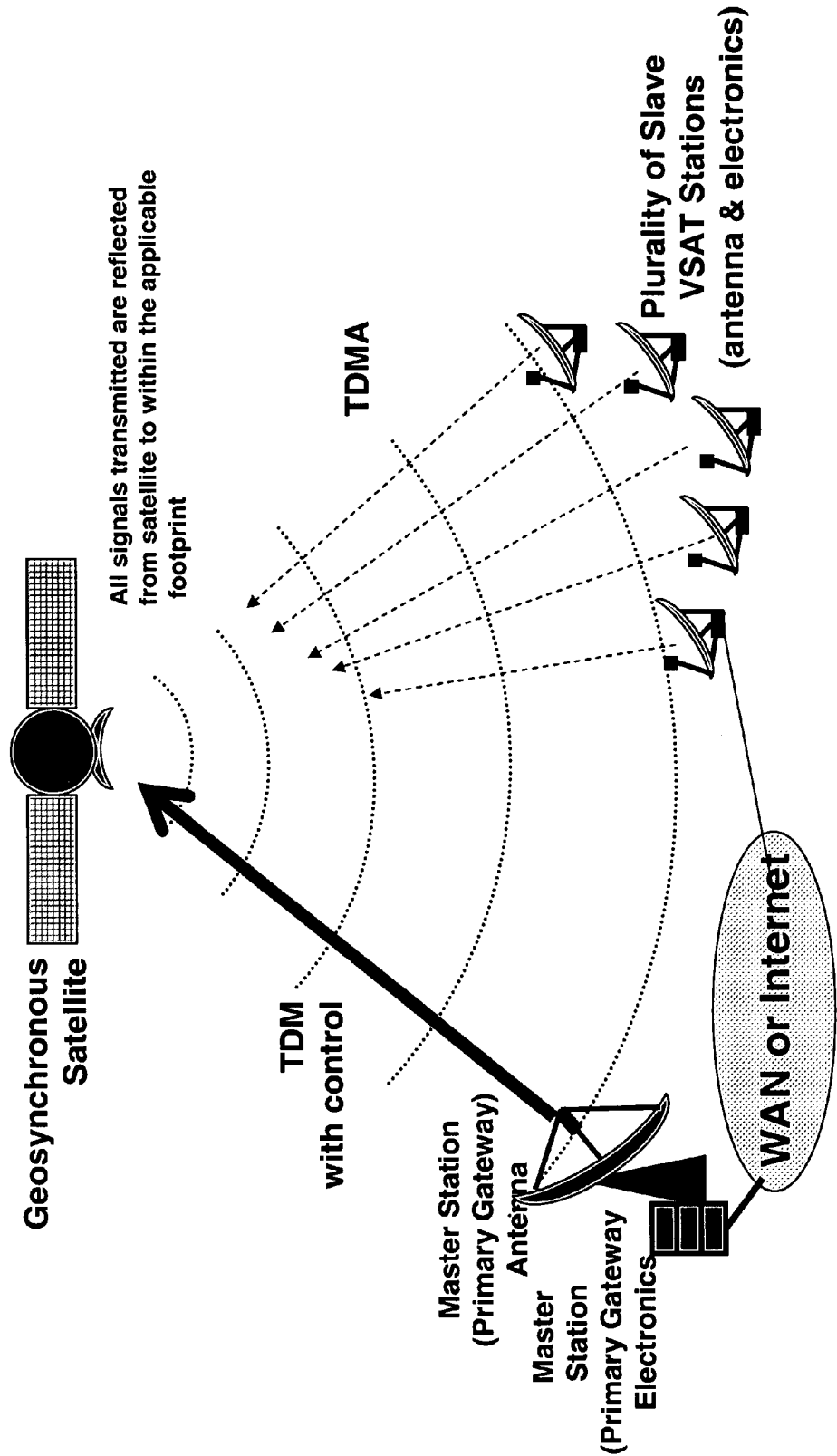
FIG. 1 illustrates a typical TDM/TDMA communication network with a master station using a geosynchronous satellite to communicate with a plurality of slave stations, where such network may also use multiple TDMA channels and thus be MF-TDMA capable.

The following description provides specific details for a thorough understanding of, and enabling description for, embodiments of the invention. However, one skilled in the art will understand that the invention may be practiced without these details. Well known structures and functions have not been shown or described in detail in order to avoid obscuring the description of the embodiments of the invention.

Disclosed embodiments present methods and apparatus for enabling a fixed or a mobile ground-based slave station (VSAT) in a TDMA or MF-TDMA network receive multiple continuous mode TDM transmissions from and transmit TDMA burst transmissions to one or more concurrently active ground-based gateway stations in a digital data networking system that employs one or more geosynchronous satellites, where each gateway station transmits on one or more forward channels, utilizing TDM techniques, but where one primary gateway station has the unique role of the master station at any given time and thus only one gateway station transmits network control messages to the slave stations (VSATs).

Notes on Terminology

A master station need not actually act as a gateway between the slave stations and the terrestrial network, neither may it be the sole communications hub in a star topology network. This is because some TDMA and MF-TDMA satellite networks may allow for partial or full mesh communications among the slave stations (without the need of those communications passing through the master station), and in such a mesh satellite communication network any one of the slave stations may in fact act as a limited gateway into the world's terrestrial networks on behalf of other slave stations that may lack such terrestrial connections. However, because the TDM continuous mode transmission and reception is more efficient and costs less to implement in hardware than TDMA burst mode transmission and reception, a gateway station resembling a master station in capabilities will generally be a more effective and efficient high-throughput gateway for high-volume traffic coming from the world's terrestrial telecommunications infrastructure going to the slave stations.

Likewise the use of "VSAT" or "terminal" (in place of "slave station") may be misleading because it obscures their fundamental role as slaves in the network, and implies that they are merely end-points in the network and/or earth stations with very small antennas, neither of which may actually be the case in the disclosed embodiments.

Therefore, throughout this detailed description, a clear distinction will be made between the role of master station vs. that of gateway station. Furthermore the term "slave station" will be used in place of "VSAT" or "terminal", because a "slave station" may neither be a communications end-point in the satellite network nor use a very small diameter antenna.

Also, for simplicity, reference to both TDMA and MF-TDMA methods will be made as "TDMA," except where it is of particular importance to distinguish those situations where multiple return to the master and possibly other TDMA channels are enabled, each at a different frequency, that can be used by the slave terminals (e.g., by frequency hopping) for communications with the master station or directly with other slave stations.

Types of TDMA Networks

TDMA networks (whether satellite-based or purely terrestrial-based network) may be static, quasi-static, or dynamic. In a static TDMA network, each slave station is given a fixed bandwidth to transmit to the master station. In quasi-static TDMA networks, the operator may change the return channel bandwidth allocated to a given station. In dynamic TDMA networks the slave stations may request bandwidth as needed for transmitting user traffic, and can be assigned that bandwidth dynamically and very quickly, within some business-oriented or policy guidelines and/or within the constraints of the technology. Most modern wide-area TDMA networks are dynamic, since it creates the greatest potential for the efficient use of bandwidth, which for "over the air" networks is usually scarce and expensive. And most modern TDMA networks are in fact MF-TDMA in nature, because they support multiple TDMA channels, each on a different carrier frequency, where slave stations may use frequency hopping to move between these TDMA channels and gain access to additional bandwidth and flexibility. However, it is very uncommon for the TDM (or forward channel) capacity in a TDMA network to be dynamically shared among multiple gateways and the master station.

One common and early form of dynamic TDMA network technology is known as "slotted aloha". In slotted aloha slave stations are allowed to transmit randomly in any time slot, within some policy constraints. There is no attempt to coordinate the transmissions of different slave stations, thus there is a chance of collisions among bursts from different slave stations that grow dramatically with the level of congestion on the network. More modern TDMA and MF-TDMA networks limit the use of slotted aloha techniques to just those infrequent occasions where it is necessary (e.g., at time of initial logon by the slave station to the network), so as to reduce the adverse impacts on bandwidth efficiency caused by this access technique. This is done by using control messages communicated to slave stations by the master station.

Role of the Master Station in a TDMA Network

The master station plays a unique and critical role in a TDMA network, whether it is satellite-based or purely terrestrial-based network. The master station provides the network clock reference information and a variety of timing correction messages, and other control messages, to all the slave stations in the network. These messages are essential to align the timing of the burst transmissions from the slave stations, whether those transmissions are addressed to the master station (for star topology operation), or between any two slave stations in the network (for a mesh topology operation).

If two or more different master stations were to attempt to provide concurrently the network clock reference information and the associated timing correction messages and other control messages independently of each other, then inconsistencies, errors and/or malfunctions would eventually occur or would be very difficult to avoid. Thus there is only one active master station in a TDMA network. This means the entire network is vulnerable and all slave stations will be unable to either send or receive traffic if the master station should fail. Present options for implementing "back-up" master stations are very limited in their ability to quickly take over control of the network.

The essential character of a TDMA network is that the slave stations share one or more transmission channels with each other. Each such transmission channel has a dedicated frequency band for its carrier frequency which is modulated in some fashion individually by each slave station. Each such transmission channel—to support the use of TDMA techniques—must be divided into a series of logical time slots during which transmission is allowed by one and only one slave station at a time, except for the possible presence of specially designated time slots that allow "random access" (e.g., slotted aloha) by any slave station without prior assignment from the master station.

When a slave station transmits on any of the available shared TDMA channels, it must transmit in a short burst, that should (if the slave station and the network overall are operating properly) fall entirely into the assigned time slots for that slave station. Thus slave stations posses what are called "burst transmitters", and master station possesses what are called "burst receivers". Burst transmitters are different in character from the continuously modulated transmitters used by the master station to transmit the TDM forward channel, in that burst transmitters must be able to turn-on and turn-off their transmitter very quickly (e.g., for a millisecond or less). Burst receivers for TDMA burst transmissions are likewise different from ordinary receivers used to demodulate continuously modulated TDM transmissions. Burst transmitters and burst receivers are often frequency agile, meaning they can change the carrier frequency they use very quickly, and perform what is called "frequency hopping".

In a modern high speed TDMA network of any type—satellite based or terrestrial—some of the allowed time slots may be only one millisecond or smaller in duration. Thus TDMA networks impose very precise timing alignment requirements upon slave stations so that when one slave station is using its burst transmitter, in accordance with timing instructions from the master stations, another slave station does not start its burst before the current slave station finishes. If this should happen, the burst transmissions of one or both stations will be corrupted and transmission errors will occur. Likewise, precise timing alignment is important so that bandwidth resources are not unnecessarily wasted by imposing undesirably large "guard times" around each time slot. However, to a small degree, such guard times are necessary because an absolutely perfect alignment of the timing among all slave stations for their burst transmissions is impractical to achieve in any TDMA technology.

Essential to a TDMA network is the time slot structure of each TDMA channel. This structure defines the precise duration of each time slot, including guard times. This may be a static and cyclical structure in simple TDMA networks, or a dynamically changing structure in more advanced TDMA networks. If it is a dynamically changing structure, each new variation of it is communicated to the slave stations periodically or on irregular basis, by the master station. The basic slot structure, the allowed usage of each slot, and instructions regarding which slave station may use which slot for what purpose are communicated to slave stations by the master station in what is commonly called the "burst plan" for the network, which may change frequently as just noted.

The slave stations will have their burst transmitters aligned with each other if and only if the time slot structure of the different channels of the TDMA network for the upcoming interval of time, as understood by each slave station, is aligned in such a way that if each slave station were to transmit in a different time slot and all time slots were occupied with bursts, no two bursts would overlap or interfere upon reception at the master station. Obtaining this alignment is not trivial given the differing time-of-flight delays, and the possibly differing transmission processing delays, associated with each different slave station.

The Challenges of Satellite-Based TDMA Networks

The use of TDMA in satellite communication systems is very common today and of growing importance. For many networking applications it has rapidly replaced a simpler but less bandwidth efficient approach known as "Single Channel Per Carrier", where one or more dedicated carrier frequencies are allocated to each ground station for its transmissions.

The implementation of TDMA in a satellite network (vs. a small terrestrial-only, wireless or wired network) however, is complicated by several factors:

a.) The large geographic extent of the network on or near the surface of the earth, typically continental in extent covering many millions of square kilometers;

b). The large and differing distances between the satellite and each of the different ground stations;

c.) A potential mixture of fixed and mobile ground stations, and d.) The fact that the satellite in the sky is typically in motion relative to the surface of the earth and hence also moving relative to all the ground stations.

Even a geosynchronous satellite—which is approximately 35,800 kilometers above the equator of the earth at any one of various longitudes along the equator of the earth, spaced approximately 2 degrees apart in longitude—typically undergoes periodic, detectable and undesirable motion about its nominal "fixed" position on the order of up to 50 kilometers.

The geosynchronous satellite obviously plays an important role in a satellite communication network. It may possibly: (a) regenerate signals from ground station transmissions and (b) switch either through IF (intermediate frequencies) or baseband signals to one or more other transponders on the satellite. But in most cases satellites today do not do this. In all cases though, the satellite: (a) amplifies the electromagnetic waves carrying transmission signals it receives from the ground stations; (b) extracts a modulated IF signal; (c) re-modulates a different carrier frequency with that signal; and (d) re-directs the new carrier frequency back to earth to reach additional ground stations, which may—and in most cases does—include the originating ground station of that signal.

The present embodiments consider satellites of all types mentioned above. This does not result in notable variations in these embodiments, because in none of these cases does the satellite play any role in aligning the TDMA timing advances of the various slave stations in a satellite network.

Ground stations working with satellites in geostationary orbit typically use directive antennas to achieve high bit rates in both transmission and reception, using power amplifiers of a reasonable scale.

The positions on the surface of the earth where a satellite, or one of its transponders, directs the electromagnetic waves it receives are usually called the "footprint" of the satellite. They may also be thought of as "beams of light" intersecting the surface of the earth. The position on the surface of the earth from which a satellite, or one of its transponders, can receive electromagnetic waves from a ground station suitably positioned and pointed at it without undue obstruction may also be thought of as being within the foot print or beam of the satellite or one of its transponders. All ground stations must be in the footprint (or beam) of the satellite to receive signals from it, and to direct signals to it. However, it must be noted that some ground stations may transmit signals to one satellite (or transponder on a satellite) and receive signals from a different satellite (or a different transponder on the same satellite). Furthermore a ground station may transmit to or receive from multiple satellites or multiple transponders on the same satellite at the same time, if its antenna and associated RF and baseband electronic are suitably configured. The disclosed embodiments include these various common and less common satellite networking arrangements.

In a modern high-speed TDMA satellite network the maximum variation allowed in the timing alignment among slave stations (hence the size of the guard times on certain time slots, particularly those used for user traffic which comprise the majority of time slots allocated to slave stations) may be less than a few microseconds. Thus, assuming for illustration purposes a 5 microsecond guard time is specified, a difference in the distance between one slave station and the master station vs. other slave station and the master station of only 1500 meters would be enough to necessitate a mechanism in place for the master station to force each slave station to correct its timing advance relative to the network clock individually given its unique position on or near the surface of the earth. (NOTE: This result is calculated simply from the speed of light in air and free space which is approximately 300,000 kilometers per second and is the approximate speed at which all electromagnetic waves travel in free space or air with some variations depending on air densities and ion concentrations).

As noted above, in any TDMA network the timing alignment required among the burst transmitters of the slave stations is most easily understood as requiring alignment upon reception of those burst transmissions at the master station where there exists the necessary burst receiver technology for capturing, demodulating and decoding each burst. Burst receivers must not only know the time slot structure (e.g., type of slots, assigned function and duration of each) used in the TDMA network for each channel, but must also know when each different type of burst time slot on each different TDMA channel is about to arrive (to within less than the size of the smallest guard time used), and in more advanced TDMA networks, like DVB-RCS, also know how each burst on each TDMA channel is modulated and encoded by the slave station that sent it. This effectively requires that burst receivers know which slave station is using which specific (i.e., numbered) burst time slot, even before the actual burst arrives at the master station. Thus it is critical for the burst receivers to be fully aligned with the detailed and constantly changing structure of burst plan and how it is being used in all these respects, not just an alignment in a simplified "relative time sense" like following the regular beat of a drum.

In a TDMA network based on the use of a geosynchronous satellite, it is useful to point out that if the burst transmitters among the slave stations are aligned properly with the burst plan for reception by the burst receivers of the master station, then the burst transmitters are also aligned—relative to each other—upon reception at the location of the applicable geosynchronous satellite itself (~36,000 km above the surface of the earth). That follows logically because the distance from the satellite to the master station is the same for the incoming transmissions of all slave stations using those same TDMA channels.

However, the distance between the satellite and the master station is not the same at different points in time. That is because of the motion of the satellite due to normal drift patterns or due to intentional positional corrections by the satellite operator for different reasons. The same applies for the distance between the satellite and each slave station. Therefore the master station must be able to frequently and individually adjust the timing advance for each slave station even if all slave stations are fixed in their locations. This is because even the slow or small drifts in the motion of the satellite may unequally affect the distance between the master station and the slave stations. Similarly, the small amounts of satellite motion can affect the relative alignment of the burst transmitters at the location of the satellite.

It is worth emphasizing that the applicable geosynchronous satellite in this case is the one used for the carrier frequencies of the applicable TDMA channel (or channels) from the slave stations to the master station. If multiple TDMA channels are used (as in MF-TDMA systems) and some are handled by one satellite and others by a different satellite, which by necessity are in different positions and undergo different motions at different times, then the master station must be able to manage multiple and distinct timing advances and adjustments, both for the satellites and for the slave stations. Furthermore, the master station must receive burst transmissions from all slave stations in the network, sent regularly via each satellite corresponding to each slave station, so that the master station can observe and compensate any timing offset observed in the burst transmissions of any slave station.

With this understanding of the unique role of the master station in a TDMA satellite network, the essential background information regarding the types of control messages transmitted by the Master Station to the slave stations in the network is described below.

Control Messages Transmitted by the Master Station to the Slave Stations

Using its TDM forward channel, a master station transmits not only the user data traffic (or user voice or video traffic) destined to one or more of the slave stations but also control messages that may be directed to one or all of the slave stations. Various ways of coding these control messages, which are sometimes called "signaling," may be used. Most TDMA networks use very efficient coding techniques for constructing these control messages to consume a minimal amount of bandwidth.

The control messages may be of various types and names and use various encodings depending on the technological heritage and applicable standards for the TDMA networking system of interest. In general, though; in all modern TDMA networks there must be sufficient signaling methods or messages to perform the following functions:

1.) Network Clock Reference Messages. These are broadcast messages transmitted to all slave stations. They carry a counter value, which may be thought of as a clock ticking, so that all slave station use the same clock. However because different slave stations will likely receive these messages with widely differing amounts of time-of-flight delay, the distribution of these messages, by itself, does not guarantee that the burst transmitters in all slave stations will be properly or adequately aligned. They simply provide a common time reference frame from which timing corrections/adjustments (i.e., timing advances) can be made to align slave station burst transmitters with each other and with the burst receivers at the master station. The farther a slave station is from the master station the larger the timing advance required for its local burst transmitter to insure that transmission bursts from all slave stations will be aligned as they return to the master station.

In DVB-RCS technology these network clock reference messages are called the Network Clock Reference (NCR), which contain a counter value of very high accuracy. The NCR in DVB-RCS systems is also a highly accurate piece of equipment located at the master station, providing an NCR with better accuracy than five parts per million (5 ppm) relative to International Standard Organization (ISO) definition of one second, the fundamental unit of time measurement in all scientific and engineering work. Longer term clock accuracy of the NCR will be better than one part in one billion (1 ppb).

2.) Burst Plan Messages. These are messages that inform the slave stations of the different types of burst time slots which they may use for transmissions to the master station. Different types of slots are used for various different functions, such as for requesting logon to the network; sending of regular transmissions; sending capacity request messages; and sending user traffic to the master station, as well as possibly for sending various types of error reports or status messages to the master station. The burst plan messages may also inform a individual slave station which particular type of slots it may use (unless the TDMA network is purely one of "slotted aloha"), and may inform a stations about what type of modulation and/or FEC encoding it should use for the that specific burst transmission as well as, for MF-TDMA networks, which TDMA channels to use for each burst transmission.

A slave station in a modern TDMA network must properly receive the burst plan message, prior to transmitting anything to the master station, unless a special dedicated channel, on a dedicated and known carrier frequency, is provided just for logons. In that case a slave station may logon prior to receiving and/or processing the burst plan information.

Most modern TDMA or MF-TDMA systems use special type of time slot, rather than a dedicated channel for "logons" to the network by slave stations. In DVB-RCS these are called Common Signaling Channel (CSC) time slots, and may be accessed in a slotted aloha manner (i.e., randomly). Typically, they are scheduled to occur relatively infrequently within the burst time plan compared to other types of time slots. This is because they are not needed very often and such time slots must generally have much larger guard times, for a slave station may not yet have adequately aligned in its burst transmitter to other slave stations or the burst receivers at the master station.

3.) Logon Response Message. This is the message that master station sends back to the slave station in response to the logon request. This message may contain a variety of information necessary, but possibly not sufficient, for the slave station to operate properly in the network.

In DVB-RCS technology, this message is typically also used to carry an initial "large timing correction message" described below, as well as session related information.

4.) Large Timing Correction Message. This is a type of unicast message that tells an individual slave station to make a large correction to its timing advance for its burst transmitter. This type of message is necessary when the master station detects that the burst transmissions from a specific slave station are so unaligned that it would be outside of the guard time allowed for other burst time slots. Thus it is of an urgent and significant nature and must be processed by the slave station with corresponding importance. Such messages are common when a slave station first logs on to a TDMA or MF-TDMA network, because the newly logged on slave station has not yet had it burst transmitters finely aligned with the other slave stations. In DVB-RCS systems this message is called the Correction Message Descriptor.

5.) Small Timing Correction Message. This message informs a slave station of the specific smaller correction it needs to make in its individual timing advance setting. Thus they may be unicast, multicast or broadcast messages depending on the specific TDMA technology involved and their implementation details. It is possible to send multiple such corrections for multiple slave stations in one message. These are not as urgent, in that even though the master station has detected a need for some corrections in timing advance of these slave stations, the slave station is not yet transmitting outside the allowed guard time for that type of burst slot.

In DVB-RCS, individual slave station messages of this type are typically broadcasted in the Correction Message Table, but may also be unicast as individual Correction Message Descriptors.

6.) Shut Down or Disable Messages. Most modern TDMA or MF-TDMA networking systems also provide unicast control messages that force a log-off of a slave station or a shut down of its burst transmitter. These are useful and necessary when a slave station is malfunctioning or repeatedly transmitting outside of the guard times allowed, and therefore causing collisions with the burst transmissions of other slave stations.

7.) Other Types of Messages. There may be many other management and control functions sent to the slave stations within any given type of TDMA or MF-TDMA technology, e.g., various type error reports or signal strength reports sent to the master station, but these are not directly relevant to the presented embodiments.

It is important to note that not all TDMA satellite networks have distinct messages types or distinct signaling methods for each of the above functions. Some networks may not even support all of these functions. However, the distinct or not so distinct character of these different types of messages and signaling is immaterial to the embodiments of the present invention. Neither is it required that a given TDMA satellite technology support all of these functions to implement the presented embodiments.

It is also important to note that a given TDMA technology may implement these messages, or signaling methods, in a variety of ways, e.g., in dedicated TDM time slots, and with various types of Layer 2 framing, e.g., MPEG framing, ATM framing, or any other types of framing at Layer 2, which allow the messages to be directed to one, multiple, or all slave stations.

Management and Control Messages Transmitted by the Slave Stations

Most modern TDMA and MF-TDMA networks support a variety of management and control messages sent to the master station by the slave stations. These were alluded to above, when discussing the types of burst time slots supported in the burst plan messages. The common types of management and control message sent to the master station that are relevant to the disclosed embodiments are:

1.) Logon Request Message. This is the message that the slave station sends to the master station to request to be logged on to the TDMA network. Typically, the slave station must identify itself by some unique unit identifier. In addition this message might also carry information about the slave station's position on the surface of the earth (longitude, latitude and possibly altitude) which will be useful in helping the master stations to establish a proper timing correction for that slave station.

Note that these messages are only for the logon of the slave stations themselves, and are not equivalent to any human user log-on processes that may be required after the station itself is logged on.

2.) Periodic SYNC Message. This is a message that must be regularly sent to the master stations by each slave station, while logged on, so that the master station may monitor the status of their alignment with other slave stations.

In the DVB-RCS technology, this message is simply called "SYNC" and is implemented by very small time slots, so as not to waste bandwidth. The time slots for SYNC messages would typically be given larger guard times than slots for user traffic because of their function of helping with misalignments in the slave station's timing advance.

3.) Capacity Requests Message. In modern dynamic bandwidth on demand TDMA networks (i.e., those that do not use slotted aloha for all user traffic) it is necessary for a slave station to be able to request that the master station assign burst time slots to it for the transmission of user traffic. Such requests may be formed by the slave stations, and processed by the master stations under various possible types of policy constraints and algorithms. In the DVB-RCS technology, this is typically how bandwidth is dynamically allocated to slave stations.

Problems Solved

As explained above, TDMA networks can have one active master station, which may also be called a primary gateway. The requirement for one, and only one, active master station within the network follows from the need for just one single station to set the network clock reference information for the entire network and to transmit the essential timing correction messages and other control messages to each slave station.

The ability to support additional ground stations (called "secondary gateways") at various locations of the network, which may have identical features and capabilities to the actual master station ("primary gateway") but which do not act as masters, has several benefits, including:

1.) The primary and secondary gateways may be located in widely dispersed and different locations. This enables the user traffic or digital content to be sent from various physical locations directly to the slave stations, without any intervening transport or other communication methods that might otherwise be required if there is only one gateway on the network. It also saves considerable bandwidth and overhead costs since the traffic or content needs to be sent only once through a single network;

2.) It allows user generated data, voice, and/or video traffic, or any type of digital content to be sent from multiple gateway stations (primary and secondary) via the TDM continuous mode of transmission, which is more efficient than TDMA transmission in the use of bandwidth;

3.) Continuous mode transmitters used by gateway stations are lower in cost than burst mode transmitters for the same modulation and encoding performance;

4.) A much greater quantity of traffic or digital content can be directed to a given slave station by having various secondary gateways operating concurrently with the primary gateway; and 5.) Any one of the secondary gateways, if suitably equipped, can very rapidly take over the role of primary gateway in an event that a current primary gateway (master station) should fail.

Of course a necessary condition for realizing some of the benefits mentioned above is that a slave station must be physically equipped with the appropriate number of TDM receivers for the number of the TDM channels they need to receive and the processing power necessary to handle the additional digital data streams which are sent to it by multiple gateways over TDM channels. Given trends in digital electronics for the common type receiver chips used in slave stations (e.g., DVB-S and DVB-S2) this is increasingly possible at low cost. Even if not all slave stations are so equipped with multiple TDM receivers, benefits such as the option of sending traffic through multiple secondary gateways in addition to the master station and the rapid failure recovery are still achievable.

FIG. 1 illustrates a typical TDMA communication network with a master station using a geosynchronous satellite to communicate with a plurality of slave stations. The master station in this example is also acting as the primary gateway to the terrestrial telecommunications infrastructure for most of the slave stations, by being connected to the Internet or other terrestrial wide-area networks (for two-way voice, data and/or video communications). All signals transmitted to the satellite are returned from satellite within the applicable footprint of the satellite as shown by the growing large arcs approaching the ground. A slave station may or may not be connected to a wide area network. The master station transmits to the slave stations using a continuously modulated TDM communication channel which carries both user traffic and control messages or signals, some individually as unicast transmissions, and some collectively as broadcast transmissions. The slave stations transmit back to the gateway using TDMA burst transmission techniques, which require alignment in the burst transmitters of the slave stations, and may require frequency hopping in those burst transmitters to support MF-TDMA techniques. In a star topology network only the master station has the ability to receive the burst transmissions from the slave stations. In a mesh topology network slave stations have the ability to receive burst transmission from other slave stations. However, only the master station has the special high-accuracy electronic timing equipment necessary to provide the required network clock reference messages to the slave stations and the ability to transmit control messages to all the slave stations.

Figure 2:
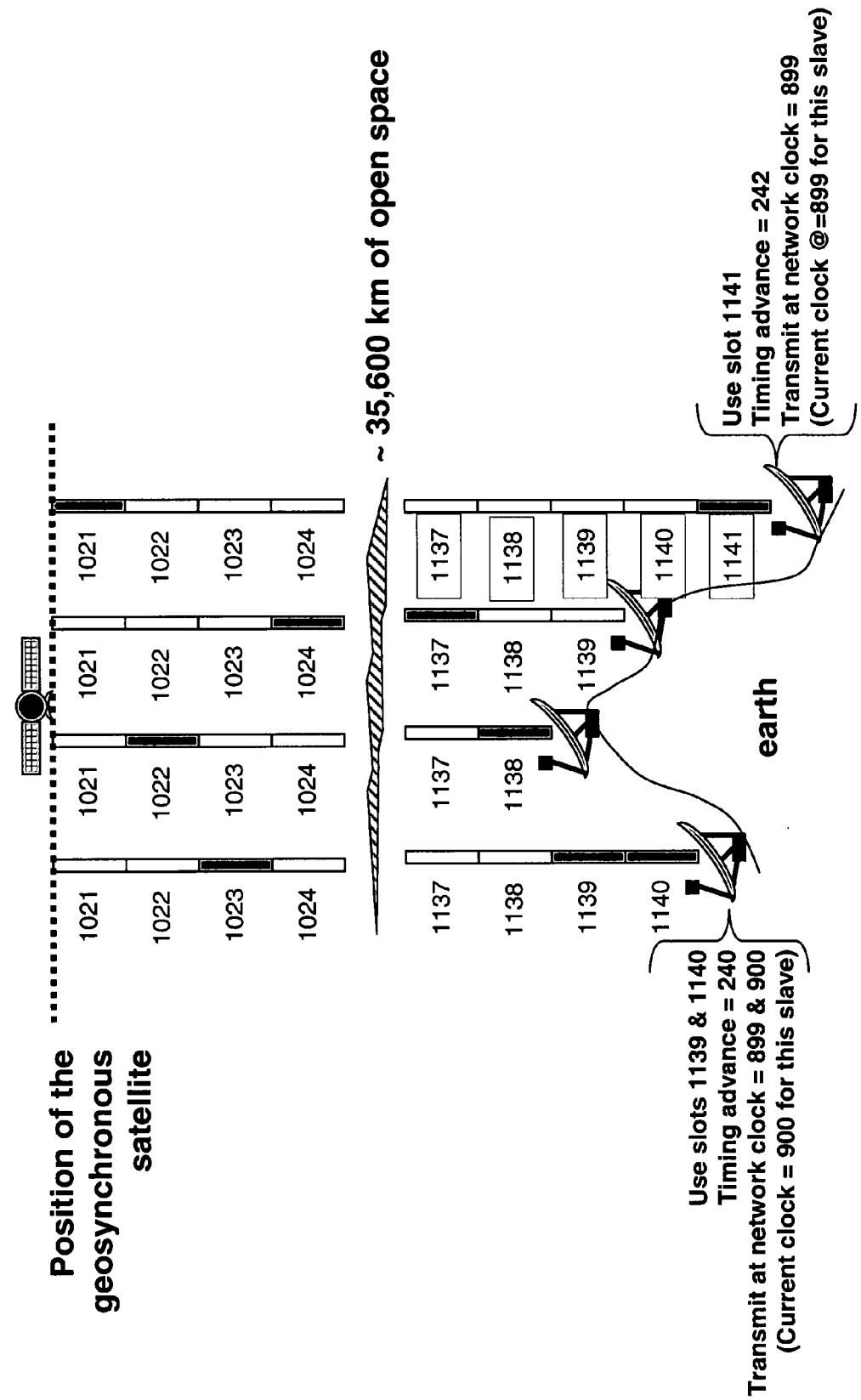
FIG. 2 illustrates a concept of alignment in TDMA burst transmissions from the slave stations to the master station.

FIG. 2 illustrates the concept of alignment in the TDMA burst transmissions from the slave stations to the master station within one TDMA channel following the instructions given in the burst time plan and using the timing advances and network clock references given to them by the master station (which is not shown). In this illustration the burst plan is shown as a number series of time slots, and alignment occurs at the geosynchronous satellite used for the TDMA channel. A grey time slot indicates that a slave station has made a burst transmission during that time slot. There are no burst collisions in this illustration and no guard times are shown. For simplicity the Figure shows a simple burst plan with all time slots of equal size, and it shows the slave stations as if they were directly beneath the satellite (generally, each slave will be at a different angle and different distance relative to the satellite, depending on its position on the surface of the earth and the distance will be greater than 36,000 km.). The numbers next to each time slot, in this illustration, are referenced to future network clock reference values—namely the times at which the master station is prepared to receive these bursts (though individual slot numbers are not explicitly carried with the time slot or the burst). It should be noticed that each slave station in this example receives each network clock reference message at a different point of time, depending on their distances from the broadcasting satellite and these slaves have similarly different distances to the receiving satellite, and therefore each of these slaves applies a different timing advance relative to its locally constructed network time reference to schedule the transmission of its bursts, such that all bursts will be properly aligned in the allowed slots of the burst plan. This example illustrates a situation where burst plan slots are about 1 millisecond in duration, since the example shows that it requires about 120 milliseconds for the electromagnetic wave carrying the burst to travel to a geosynchronous satellite if the slave station is directly beneath the satellite at the equator. For simplicity a very coarse time counter (and slot numbering) using 1 millisecond intervals is shown. In a high-performance TDMA satellite network the counter resolution would have to be several orders of magnitude more granular.

Figure 3:
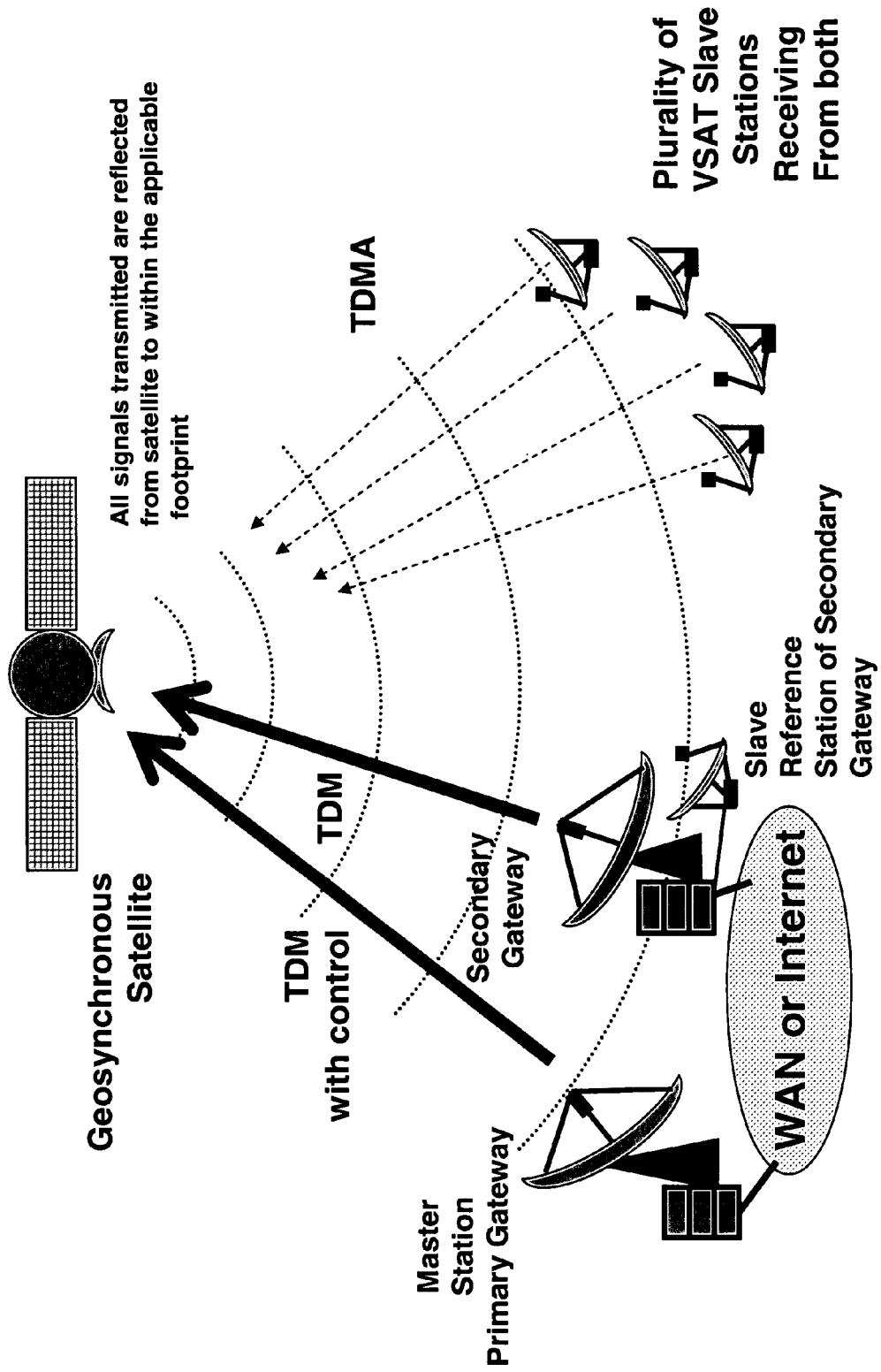
FIG. 3 illustrates a TDM/TDMA communication network using a geosynchronous satellite that has one master station (also acting as a primary gateway) and a secondary gateway communicating with a plurality of slave stations (VSATs).

FIG. 3 illustrates a TDMA communication network using a geosynchronous satellite that has one master station (also acting as a primary gateway) and a secondary gateway communicating with a plurality of slave stations (VSATs). Even though the secondary gateway may be capable of being the master station, because it has the special electronic equipment (e.g., accurate timing sources) and other necessary control capabilities (e.g., network control computers and software) to act as a master station, it does not perform those functions while acting as secondary gateway. It transmits a continuously modulated TDM forward channel to the slave stations that contain only user traffic. It also has the ability to receive burst transmissions from slave stations on one or more TDMA channels. To do this, however, it must have its burst receivers aligned with the overall burst plan for the network.

Figure 4:
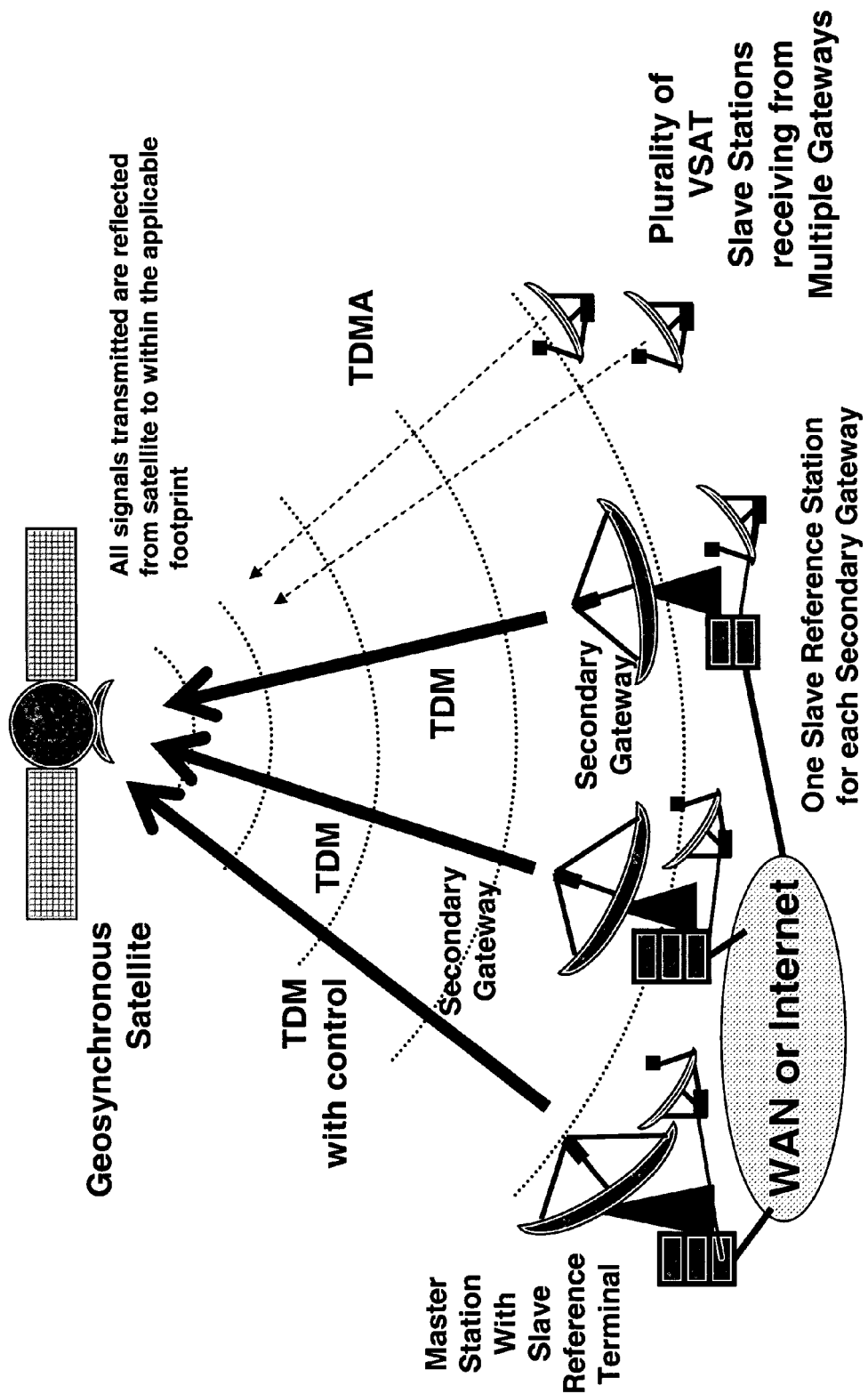
FIG. 4 shows a TDM/TDMA satellite communication network with one master station acting as a primary gateway and two secondary gateways.

FIG. 4 shows a TDMA satellite communication network with one master station acting as a primary gateway and two secondary gateways. It is straight forward to support a plurality of secondary gateways in this fashion. However, there can only be one station acting as the master station in this network.

Figure 5:
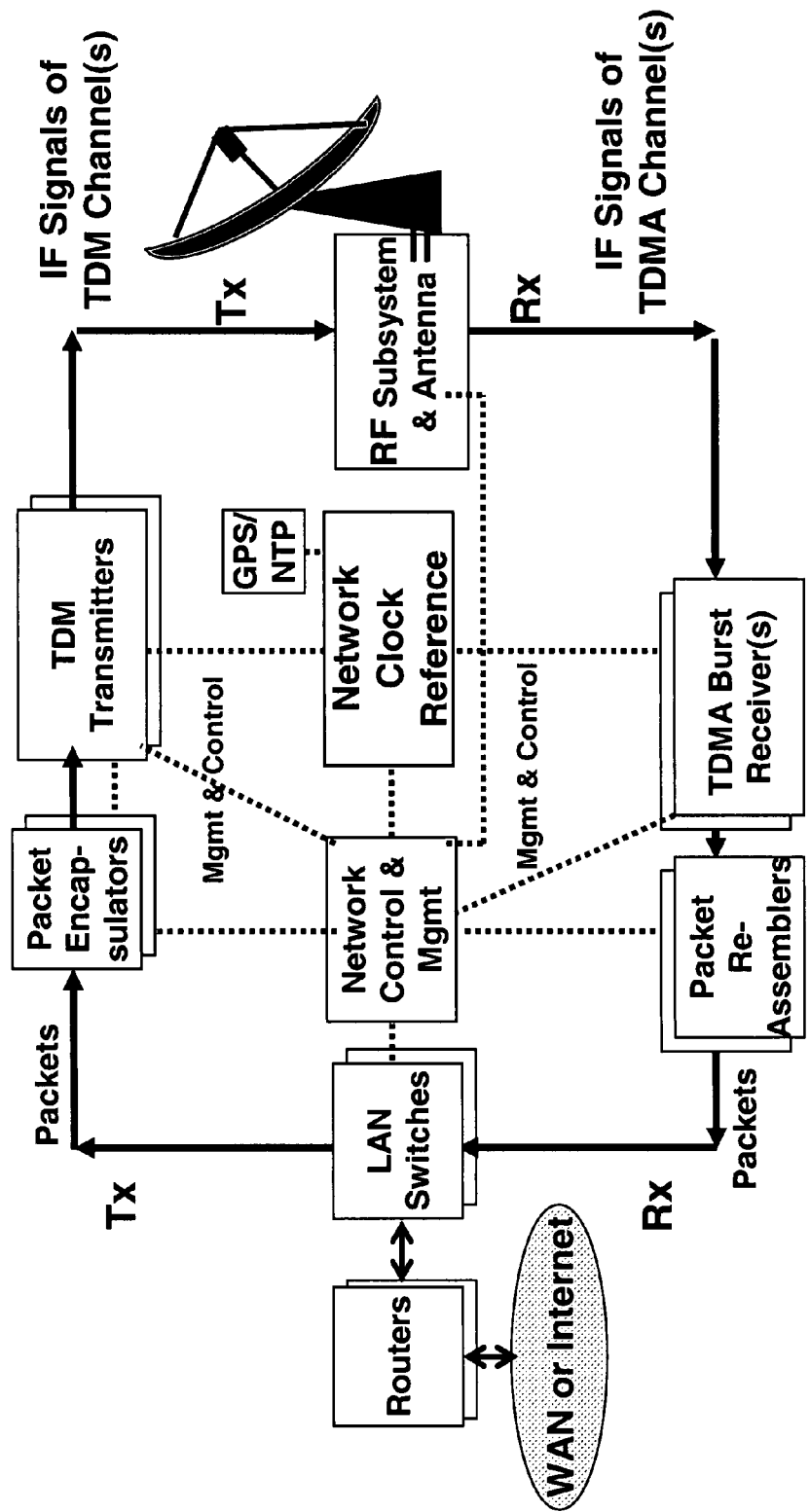
FIG. 5 shows common elements of a typical master station in a modern TDM/TDMA satellite network which also acts as a gateway to the Internet or a WAN.

FIG. 5 shows common elements of a typical master station in a modern TDMA satellite network which also acts as a gateway to the Internet or a WAN. After traffic in the form of Layer 3 data packets—typically Internet Protocol (IP) packets—enters from (or before it exits to) the Internet or WAN via a router, it may pass through a LAN switch to separate the transmit (Tx) path from the receive (Rx) path of traffic flow. On the transmit path Layer 3 packets are then encapsulated, typically using a standard multi-protocol encapsulation method, and placed into Layer 2 frames (e.g., MPEG frames in DVB-RCS systems) specified by the TDM/TDMA network. This may involve fragmentation of the encapsulated packet, since they are often longer than the size of the Layer 2 frames used. The Layer 2 frames are multiplexed serially and then submitted for Layer 1 FEC (Forward Error Correction) encoding and digital modulation, typically using schemes such as QPSK or 8PSK. This is performed by the TDM transmitters which operate in continuous modulation mode. A TDM transmitter typically up-converts the modulated signal to Intermediate Frequency (IF) signal. It then submits it to the Radio Frequency (RF) subsystem for transmission. If there are multiple TDM channels then multiple TDM transmitters are required. The RF subsystem converts the IF signal to even higher radio frequencies, amplifies the signal and transmits it to the satellite via the antenna. On the receive path, the incoming TDMA channel(s) are first received by the antenna, down converted to IF and amplified by the RF subsystem. If there are multiple TDMA channels, a number of them may be handled by a single wide-band TDMA burst receiver, which demodulates and decodes the traffic burst signals on each channel. These decoded Layer 2 frames are then handled by the packet re-assembler which re-builds the original packets. The many required interconnections for management and control are shown as dotted lines. Layer 2 control messages, including network clock reference messages, and any special signaling for the slave stations are injected by the network control and management system directly into the TDM transmitter, but only on one TDM channel; Layer 3 management messages (e.g., SNMP) are injected into the packet encapsulator. Incoming control messages from slave stations (e.g., logon requests, capacity requests) are extracted by the TDMA burst receivers and passed directly to the network control and management system. The network clock reference equipment provides the accurate timing reference information for the network, which may be connected to a GPS timing reference and Network Time Protocol (NTP) client.

Slave Station (VSAT) Capable of Communicating with Multiple Gateways

A slave station (VSAT) configured to concurrently and bi-directionally communicate with multiple gateways is disclosed, herein referred to as a multi-gateway enhanced slave station or VSAT. In one embodiment it is configured such that it may be implemented in any common TDM/TDMA networking technology, including DVB-RCS standard technology. In another embodiment it is also configured such that the multi-gateway enhanced slave station is able to operate in a network concurrently with the master station and slave stations comprising a typical TDM/TDMA network of the technology type for which it is implemented.

Figure 7:
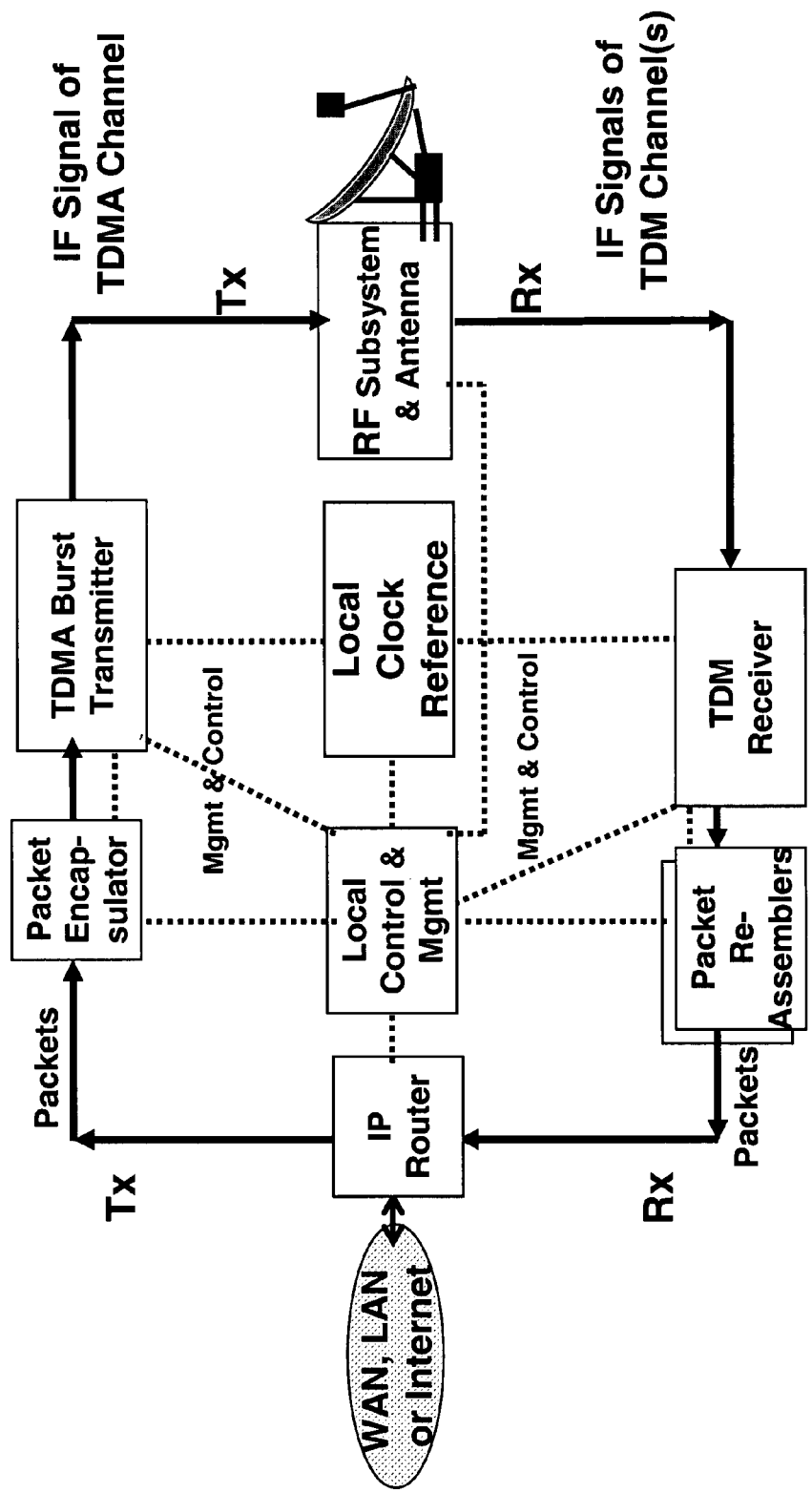
FIG. 7 shows a typical slave station (VSAT) in a TDM/TDMA network supporting only star topology networking with the master station.

FIG. 7 shows a typical slave station (VSAT) in a TDMA network supporting only star topology networking with the master station. It bears some resemblance to a master station, but it uses TDMA bursts for transmission on one or more designated TDMA channels and receives on one or more continuously modulated TDM channels from the master stations. It extracts control messages—including network clock reference messages and timing corrections—from the designated TDM control channel, which may also carrier user traffic, and uses these to align its burst transmitters with the burst receivers at the master station, and to learn about the burst plan for the network. The slave station constructs its own image of the network clock reference based on the received network clock reference broadcasted from the master. It uses this locally constructed network clock reference as the basis for burst transmission alignment, adjusted by, potentially, a nominal timing advance or a specific master controlled timing advance applicable for the state and operation of the slave station. If applicable, the nominal advance offset is typically set to compensate for the propagation delay between the geographical position of the slave and the geographical position assumed for the network clock reference, and propagation delay between the geographical position of the slave and the geographical position to be assumed to require alignment of bursts, nominally the position of the burst receiving antenna at the satellite.

Figure 8:
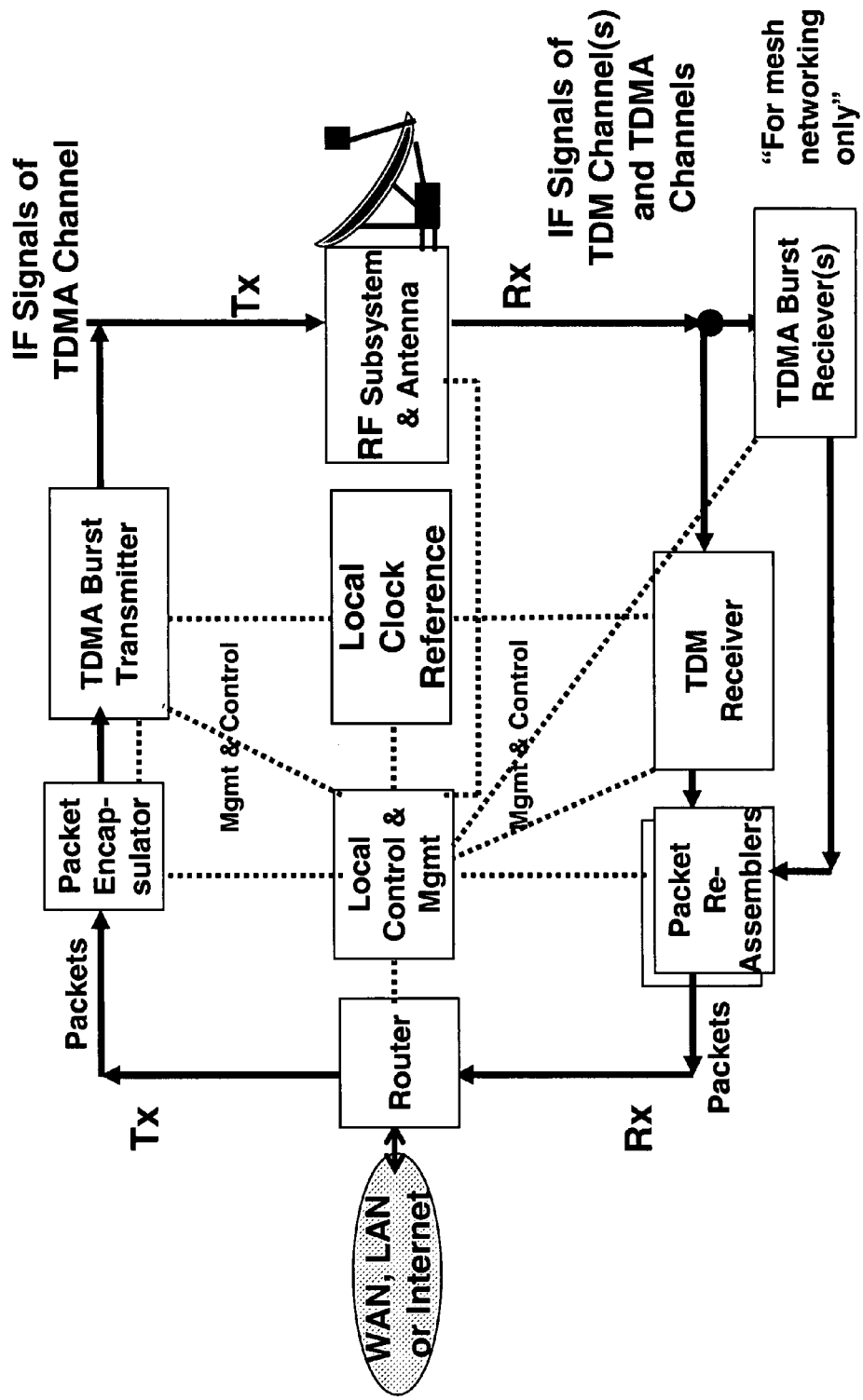
FIG. 8 shows a slave station (VSAT) that has mesh topology networking capabilities.

FIG. 8 shows a slave station (VSAT) that has mesh topology networking capabilities. It is the same in most respects to a slave station with only star topology networking, but in addition, it has one or more burst receivers attached to the Intermediate Frequency (IF) Rx cabling via a splitter, or other mechanisms, to receive the carrier frequencies used for TDMA transmissions from other slave stations.

The multi-gateway capable slave station apparatus is formed by using a ground station having the same types of hardware and software capabilities as is typically used in a slave station (VSAT) for either star-topology or mesh-topology networking (see FIG. 7 and FIG. 8) with geostationary satellites, as employed for that particular type of TDMA (or MF-TDMA) satellite networking technology, but with the following changes:

a.) Additional TDM receivers are attached to the Intermediate Frequency (IF) receive side (Rx) of the slave station's RF and antenna subsystems. In one embodiment each TDM receiver may be simply a semiconductor chip with some minor support circuitry. It is also possible that two or more TDM receivers for the type of Layer 1 modulation and encoding used in the network be implemented on a single chip. (See FIG. 9 and FIG. 10, which are described below.)

b.) One of these TDM receivers sets its local oscillators to tune to a previously configured carrier frequency (or frequency band) for the TDM channel designated by that network as the master TDM channel, which contains essential network control information transmitted by the master station, particularly the network clock reference, burst plan information, logon responses and any additional timing related or timing correction information necessary for the slave station to determine its appropriate timing advance needed to align its TDMA burst transmitter with the burst receivers of the master station, and to behave as a proper citizen on the network. The slave station may—and it would in general—also receive traffic routing control information over this TDM channel from the master station, so that the slave station learns which gateway station (or other slave station) it should direct certain classes of user traffic to, using its MAC Layer (Layer 2) addressing and handling capabilities. However, it is possible that traffic routing information may be sent over supplementary TDM channels not used for basic network control functions such as timing control, if they are addressed at Layer 3 to the routing function in the slave station for it to processes directly. (See FIG. 11 and FIG. 12, which are described below)

c.) In addition, it may have multiple TDMA burst transmitters to support additional flexibility and capacity in its communication with multiple gateways and other slave stations. Normally TDMA burst transmitters are considerably more expensive that TDMA burst receivers, and normally slave stations receive more traffic than they transmit, so this is not a requirement of a multi-gateway enhanced slave station. However, it is a desirable option in some networks, where some sites have large amounts of traffic to transmit, but may not be able to justify having an entire gateway system.

Figure 9:
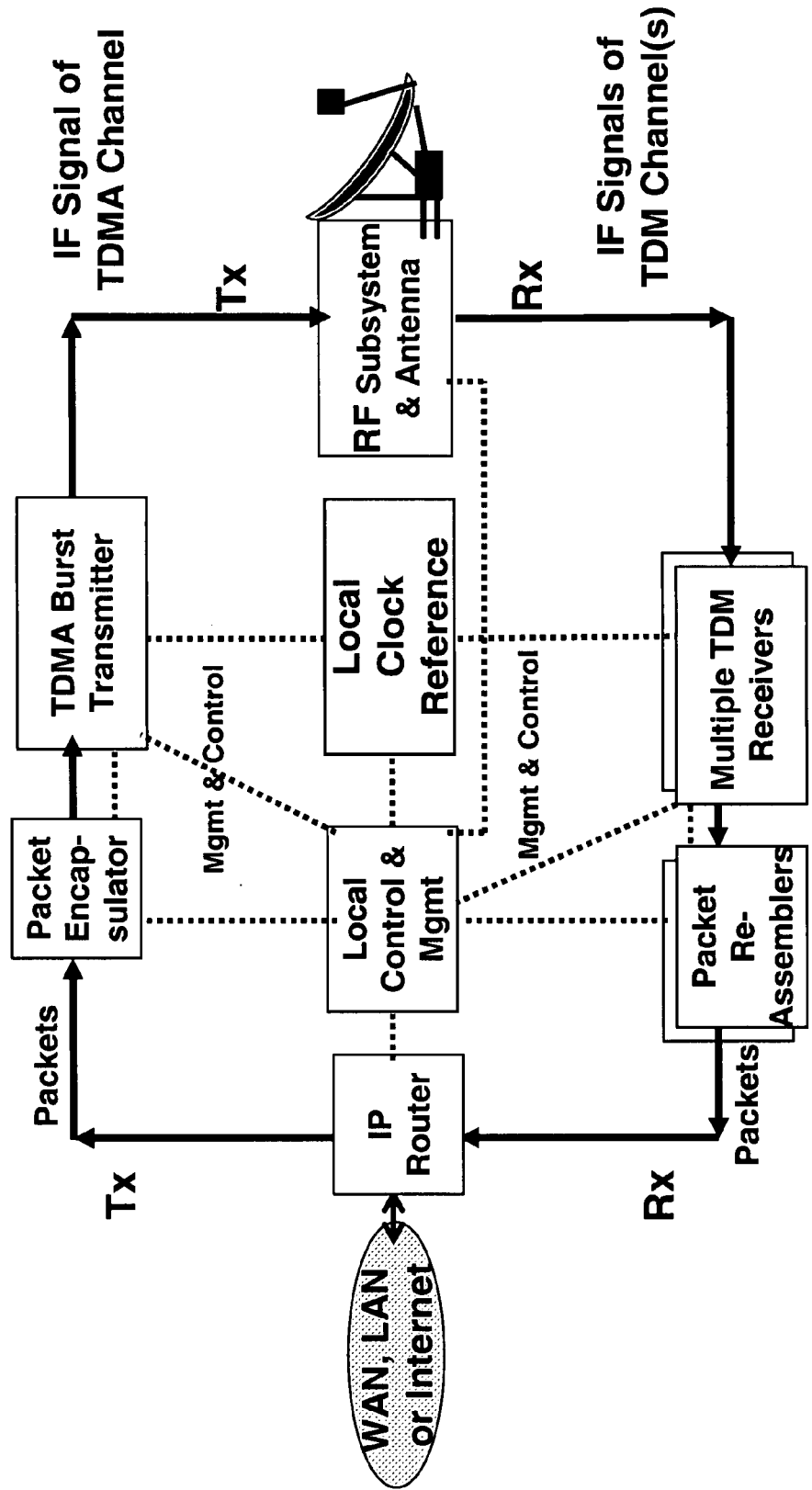
FIG. 9 shows a slave station (VSAT) supporting only star-topology networking having multiple TDM receivers to receive the communications of multiple TDM channels from FIG. 10 shows a slave station (VSAT) supporting both star-topology and mesh-topology networking having multiple TDM receivers to receive the communications of multiple TDM channels from multiple secondary gateway stations, in addition to one or more TDM channels from the master station or primary gateway.

FIG. 9 shows a slave station (VSAT) supporting only star-topology networking—as disclosed herein—having multiple TDM receivers so that it may receive the communications of multiple TDM channels (for user traffic only) from multiple secondary gateway stations, in addition to TDM channel from the master station (or primary gateway) which contains network control information. (In addition it may have multiple TDMA burst transmitters to support additional flexibility and capacity in its communication with multiple gateways and other slave stations.)

Figure 10:
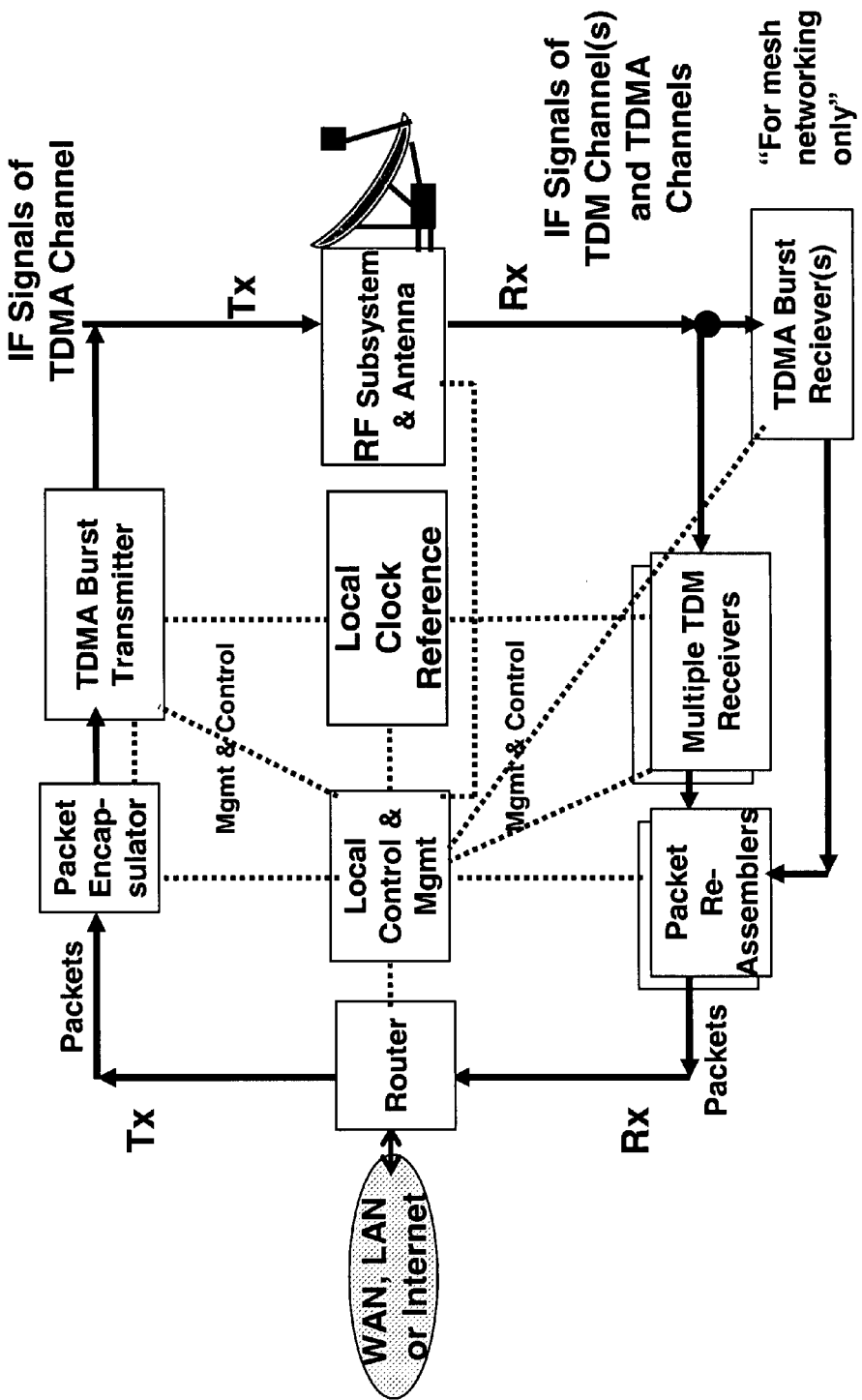

FIG. 10 shows a slave station (VSAT) supporting both star-topology and mesh-topology networking—as disclosed herein—having multiple TDM receivers so that it may receive the communications of multiple TDM channels (for user traffic only) from multiple secondary gateway stations, in addition to TDM channel from the master station (or primary gateway) which contains network control information. For mesh networking the slave station (VSAT) also has one or more TDMA burst receivers so that it may receive traffic from other slave stations over TDMA channels. (In addition it may have multiple TDMA burst transmitters to support additional flexibility and capacity in its communication with multiple gateways and other slave stations.)

Figure 11:
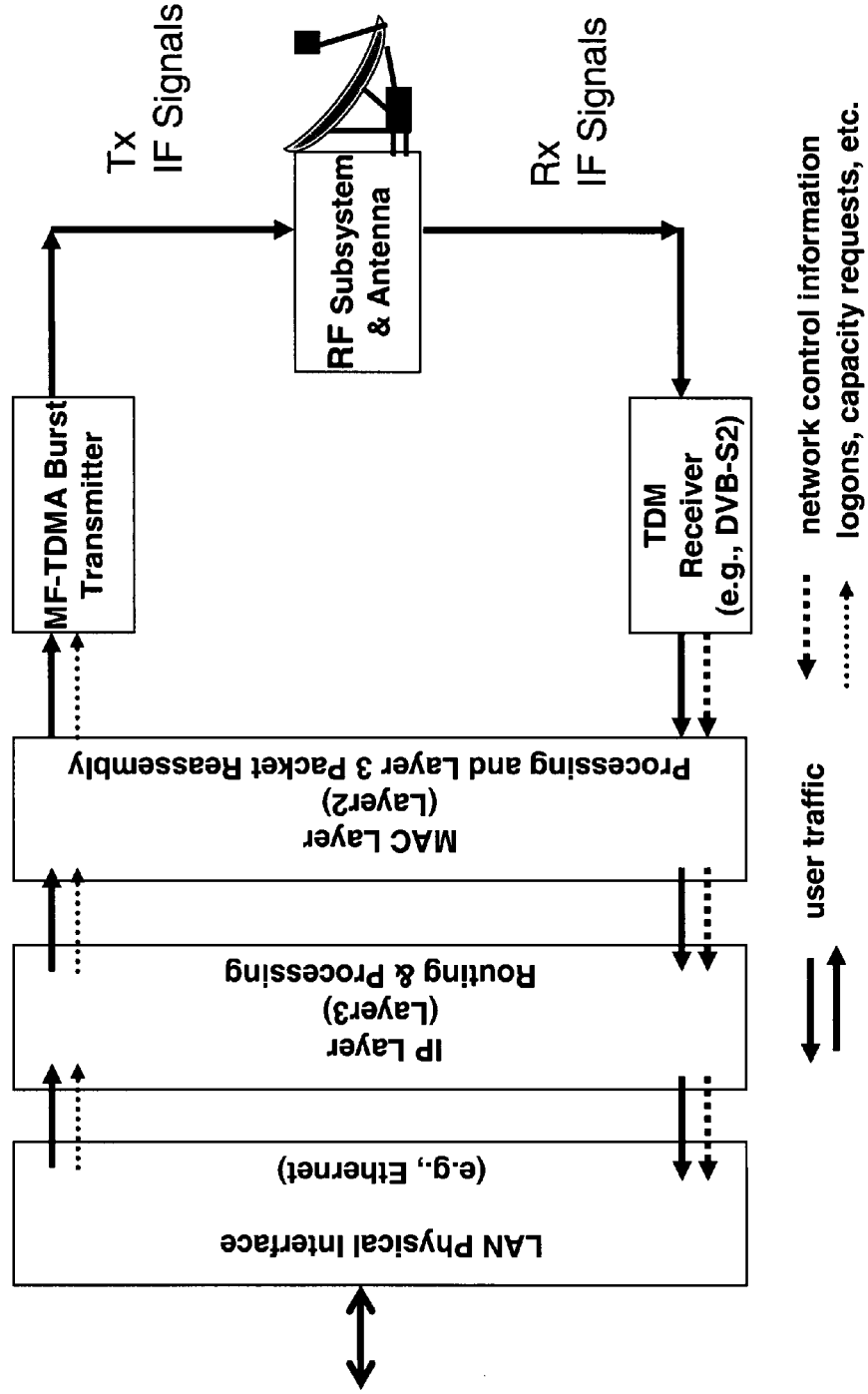
FIG. 11 shows a logical layer process of a typical slave station (VSAT) with one TDM receiver.

FIG. 11 shows functional processes of a typical slave station (VSAT) with one TDM receiver. In this case both network control information and user traffic is received over the single TDM channel from must come from the master station (or primary gateway). Both user traffic and network management related information generated by the slave station (such as logon requests, capacity requests, error reports, etc.) are transmitted via the station burst transmitters.

Figure 12:
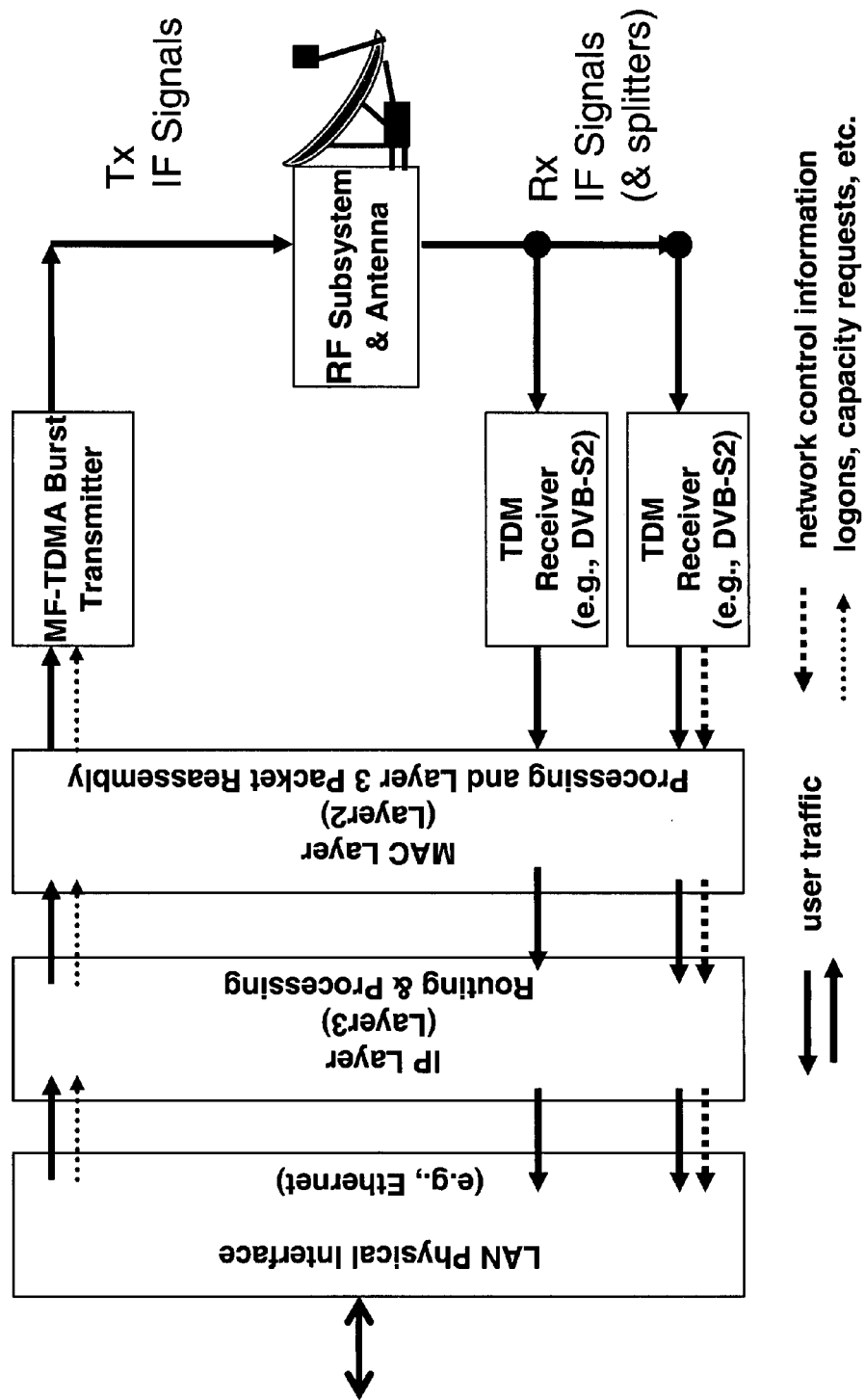
FIG. 12 shows a logical layer processing of a slave station (VSAT), where there are multiple TDM receivers but only one TDM receiver is receiving the TDM channel from the master that contains the network control information, which may also carry user traffic.

FIG. 12 shows functional processes of a slave station (VSAT) as disclosed herein, where there are multiple TDM receivers (to receiver multiple channels), but only one TDM receiver handles the TDM channel from the master that contains the network control information.

Figure 13:
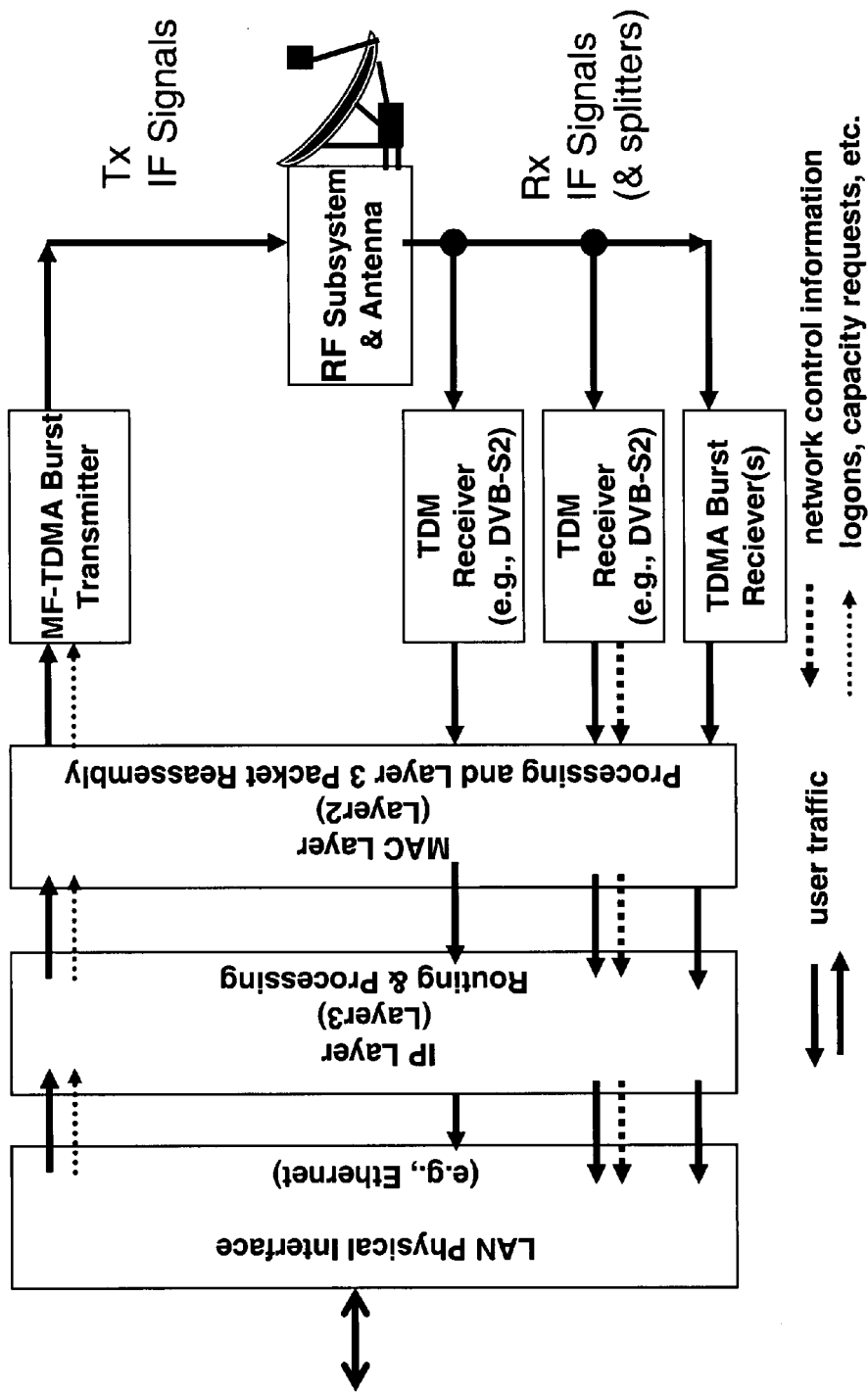
FIG. 13 shows the logical layer processing of a slave station (VSAT) that has mesh networking capabilities, where there are multiple TDM receivers to receiver multiple channels, but only one TDM receiver is receiving the TDM channel from the master that contains the network control information, which may also carry user traffic.

FIG. 13 shows the functional processes of a slave station (or VSAT) as disclosed in this invention, that has mesh networking capabilities, where there are multiple TDM receivers (to receiver multiple channels), but only one TDM receiver handles the TDM channel from the master that contains the network control information.

Method of Log-on by Multi-Gateway Enhanced Slave Station (VSAT)

In some of the embodiments the slave station proceeds to log on to the network as it normally would. This typically involves the slave station providing a unique hardware address (typically its own Layer 2 or MAC address) to the master station, and may required additional customized passwords or keys to be entered into the slave station prior to its initial logon attempt. If the log-on is successful, the master station will inform the slave station of the usual information it provides to all newly logged-on slave stations. This information—as customary today—may include: a different TDM channel to listen to of those which are transmitted by the master station for its routine operation. This other channel, if applicable, will become the active control channel for the slave station on this network, and if so, the slave station will discontinue listening on initially configured TDM channel carrier frequency, and possibly then re-logon to the newly designated TDM channel. In addition this typical information may possibly include position information (e.g., longitude, latitude, altitude) pertaining to the location of master station, the nominal position of the satellite, and the position of the slave station itself, to assist in aligning the timing of its burst transmitters. Additionally, it may include timing correction messages (large and small) for the same purpose.

The master station can identify the multi-gateway enhanced slave stations by their Layer 2 address or another identifier configured into the slave station for log-on, which the master station knows to look for based on details of the implementation desired, which can be easily devised by a person skilled in the art.

After successful log-on, the multi-gateway enhanced slave station may also be provided, as disclosed herein, with certain additional informational messages by the master station, containing information such as the carrier frequencies modulation rates and FEC encoding used by other gateways for the supplementary TDM channels they transmit and the TDMA channels they receive; the satellites used for these supplementary TDM and the various additional TDMA channels and the nominal positions of the satellites used for these channels; the nature of the informational content services or interactive services available from those gateways; their location, their hours of operation, etc., so that the slave station may make the best use of the available other gateways on the network and their supplementary TDM channels. If this approach is not used then the multi-gateway enhanced slave station may be preconfigured with this information or a sub-set of it. These messages may be implemented in a variety of forms and delivered via a variety of common or standard mechanisms, and may be easily devised and implemented by a person skilled in the art, either at Layer 2 or at Layer 3.

The master station may also securely transmit certain keys or passwords to use on the network to gain access to certain other gateway stations and or their supplementary TDM channels, or as needed to transmit to those other gateways, or as may be needed to decrypt content that is distributed by the master station or other gateway stations over those supplementary TDM channels, as needed to make the best use of other gateways and the available supplementary TDM channels on the network. Such keys or passwords can be distributed securely by using, for example, well-know techniques involving Public Key Infrastructure (PKI) technology and in messages similar to those devised above for distributing other information to the multi-gateway enhanced slave stations.

These supplementary TDM channels may be used by secondary gateways or the master for transmission of the outbound component of interactive data, video conferencing or voice traffic, or the transmission of broadcast or multicast one-way traffic. Interactive traffic and/or digital content may be distributed in either standard (e.g., MPEG) or other types of Layer 2 frames, or in Layer 3 data packets such as IP (and encapsulated into Layer 2 frames for transport over the satellite network), or a combination of all of these (e.g., interactive traffic at Layer 3 or Layer 2, Layer 2 broadcasts and multicasts, as well as Layer 3 broadcast and multicast traffic), and the method of distribution may vary by supplementary TDM channel.

The additional TDMA channels may be used by the enhanced slave stations for transmission to the various other secondary gateway stations, as well as for mesh communications with other slave stations, if so allowed by the master station.

If the multi-gateway enhanced slave station is to take advantage of using multiple TDM channels and/or TDMA channels concurrently, and some of those are on multiple different satellites, then it may have either an antenna that supports transmission and reception concurrently to those multiple satellites, or multiple antennas (and necessary associated RF electronics with each antenna, e.g., Low Noise Amplifier, and Block Up-converter), each pointed to the appropriate satellite, if such antenna direction diversity is required for the satellites used.

Transmitting via TDMA to Secondary Gateways

Using any of the above mentioned methods, the multi-gateway enhanced slave station (VSAT) may now engage with and receive digital content or user traffic from multiple other TDM channels and multiple other gateways. To send TDMA burst transmission to these other gateways, however, the slave station must be sure, or else the overall implementation of the multi-gateway networking system of which the slave station is a part must be able to assure without any extra effort by the multi-gateway enhanced slave station, that the slaves TDMA burst transmitting schedule is appropriate for reception of the slaves transmission bursts by any other applicable gateway's TDMA burst receivers. Given that each other gateway is at a separate location and may have only its own local timing reference, which is not necessarily perfectly adjusted to be aligned with the master station's overall network clock reference, this is not a trivial problem. Therefore, for the multi-gateway enhanced slave station to engage with other gateways for the purposes of exchanging interactive traffic, or any traffic that requires transmission to other gateways, additional considerations are required. However, there are multiple options for accomplishing this objective. These optional methods include:

a) Having each slave station maintain separate timing advance values to use with its burst transmitters, for each different gateway to which it wishes to communicate. They will be applied relative to slave station's local construction of the master station's network clock reference, where each slave station obtains the necessary information to determine these different timing advance values by using a combination of highly accurate transit time information for the TDMA carrier signals. These transit times for determining these timing advances may include: (1) that between itself and the satellite for those TDMA channels; (2) that between the same satellite and the master station; and (3) that between the same satellite and each secondary station to which it wishes to transmit. All of this is very dynamic information, given the continual relative motion of the satellite, thus it places a fairly large burden on the slave station. This option is also limited because it means that a slave station cannot transmit using a single burst transmitter, the same message or data packet to multiple gateways at the same small instant of time.

b) Having the master station determine and inform each slave station of the various timing advance values it must use to transmit to the other gateways in the network, which the master station may be able to accomplish through knowing these same three transit times as described in a), either by measuring them directly or by calculating them from accurate position information about each slave station, gateway station, the applicable satellites and itself The burden this places on the master station may be eased by having each secondary gateway station take responsibility for measuring its own transit delay to the satellite, and independently providing that information to the multi-gateway capable slave stations. However, this approach is also subject to the same functional limitations as above regarding concurrent transmission in a small instant of time, if the enhanced slave station has only one burst transmitter.

c) Having each secondary gateway station determine for itself and maintain a single timing advance (or retard) which will assure that if the slave stations are suitably aligned in their timing advances for burst transmissions to the master station, that those same TMDA transmissions can be received properly at each secondary gateway. This is a preferred option since it puts only a small burden on the secondary gateways to maintain this single timing advance (or retard) for itself. It also allows each gateway, including the master station, to receive the same TDMA burst transmissions from any given burst transmitter in any slave station (enhanced or not) as long as each such gateway is equipped with sufficient numbers of frequency agile TDMA burst receivers, or simpler types of burst receivers, for that number of TDMA channels used by those slave stations and where the secondary gateway is in the footprint of the satellite used for those TDMA channels.

d) Having the master station perform for the secondary gateway stations what is described above in "c" and transmit that information to the secondary stations. This is technically possible but may not be as reliable and lacks certain benefits related to allowing for distributed operation and fast turnovers from the master station to a specially designated secondary gateway station (or order list of such), should the master station fail.

e) Having each gateway station be a master station for the TDMA channels that it receives. This effectively makes the multi-gateway network into multiple separate TDM/TDMA networks. It provides some desired capabilities of the present invention and therefore may be considered part of it, to the extent that, as described below, it extends beyond the trivial option of simply implementing multiple networks. Thus, within the context of configuring each slave station to communicate with multiple gateway stations, this method may be enhanced as follows:

i) Each enhanced slave station logs on to its default gateway station by listening to the default (i.e., preconfigured) carrier frequency for that station's TDM control channel, using the appropriate demodulation and decoding parameters.

ii) The enhanced slave station can receive information about other TDM channels as discussed above and perhaps receive user traffic or digital content downloads from many of others TDM channels (but must discriminate and filter out all Layer 2 and possibly Layer 3 packets pertaining to TDMA network control and timing and other such unique control messages that might be in conflict with those transmitted by its current master station, while it continues to listen to the other information on those channels).

iii) If this enhanced slave station wishes to transmit to a different gateway station than its current master/default station, it can either re-tune the TDM receiver that it is using for reception of the TDM control channel from its current master station to a TDM control channel of another gateway acting as a master, or, it must change how it is filtering network control information so as to filter-out the information coming from current master and start listening to and responding to the control information from another gateway acting as new master. This would likely require logging off the current master and logging on to the new master gateway so that orderly tracking of such changes occurs and do not appear to be failure events at slave stations. Thus the "enhanced" slave station, in this embodiment, can only transmit to one master station at a time, and most likely must also log off and log on each time it wishes to transmit to a different master.

Methods "a" and "b" above can be accomplished (assuming the master station already has the ability to determine the timing advance that should be used by slaves for transmissions to itself) by measuring or calculating the following:

M=the transit time between the master station and the applicable satellite

G=the transit time between secondary gateway of interest and the same satellite

And then, the timing advance required for TDMA transmission to the secondary gateway of interest is calculated for a slave as an adjustment to the timing advance used for transmission to the master as follows:

$$\text{Timing\_Adv\_for\_}Tx\_\text{to\_}2^{nd}\_\text{Gateway}=\text{Timing\_Adv\_for\_}Tx\_\text{to\_Master}+(G-M)$$

However this approach works only if the burst receivers at the secondary gateway of interest are perfectly aligned to the same timing reference as those of the master station, as if the two were one. Due to the distance between them the gateways will have to undertake additional measures which a person skilled in the art can implement, such as using a common external timing reference (e.g., a GPS timing reference and/or a Network Time Protocol timing reference).

Method "c" above can also be accomplished by knowing those same two transit times above (M & G). The timing advance (or retard) required to align the secondary gateways burst receivers to the burst plan relative to the timing applied for the master TDMA burst receivers, is calculated as: 2*(G−M). This additional advance (or retard) must then be applied relative to the network clock reference and any advance (or retard) applied for the master TDMA burst receivers relative to the network clock reference. The secondary gateway may simply construct a local version of that network clock reference based on received network clock reference messages. The timing advance relative to this locally constructed network clock reference (which is subject to the transit delay between the master and the secondary gateway) is calculated as: G+M+2*(G−M)+Master-Receiver-Advance/Retard.

Method "d" can be accomplished the master station making these measurements or calculations and supplying them to the secondary gateways, however the additional delay in distributing that information to the secondary gateways will make this method less accurate.

Method "e" is fundamentally different in nature and is fully described above.

Note that it is common practice for such one-way transit delays (e.g., the values of M and G above) to be measured by having the ground station measure the round-trip transit time between itself and the satellite, and then divide by two. It is common for master ground stations to have this ability and anyone skilled in the art can add such capabilities to a ground station.

Concurrency in Transmission and Reception

Note that the term "concurrently" in the world of digital communications can be inexact and may be applied in the case of multiplexing and/or very fast switching. Thus, considered above are various options that will or may yield the desired effect of concurrent transmission to multiple gateways, depending on the speed at which such "switching" occurs.

Also note that while it has been assumed that the multi-gateway enhanced slave stations, devised for use in either star topology networking or mesh topology networking, need not have multiple and separate physical TDMA burst transmitters, it may be possible and desirable to have them in some instances. Nonetheless, the concurrent transmission to multiple gateways over multiple different TDMA channels can be achieved even with just one TDMA burst transmitter, because these devices are very frequency agile, with sub-millisecond agility in some cases.

Likewise, concurrent reception at a slave station from multiple gateways could in theory be achieved by "frequency hopping" of the frequency carrier or band at which a single TDM receiver in the slave station is tuned. This is not well suited to TDM (continuous mode) receivers. While it would be a "slow frequency" hopping, and may not appear to the users as "concurrent" it may be considered one possible implementation option for concurrent reception from multiple gateways.

Formation of Secondary Gateway Stations

Figure 6:
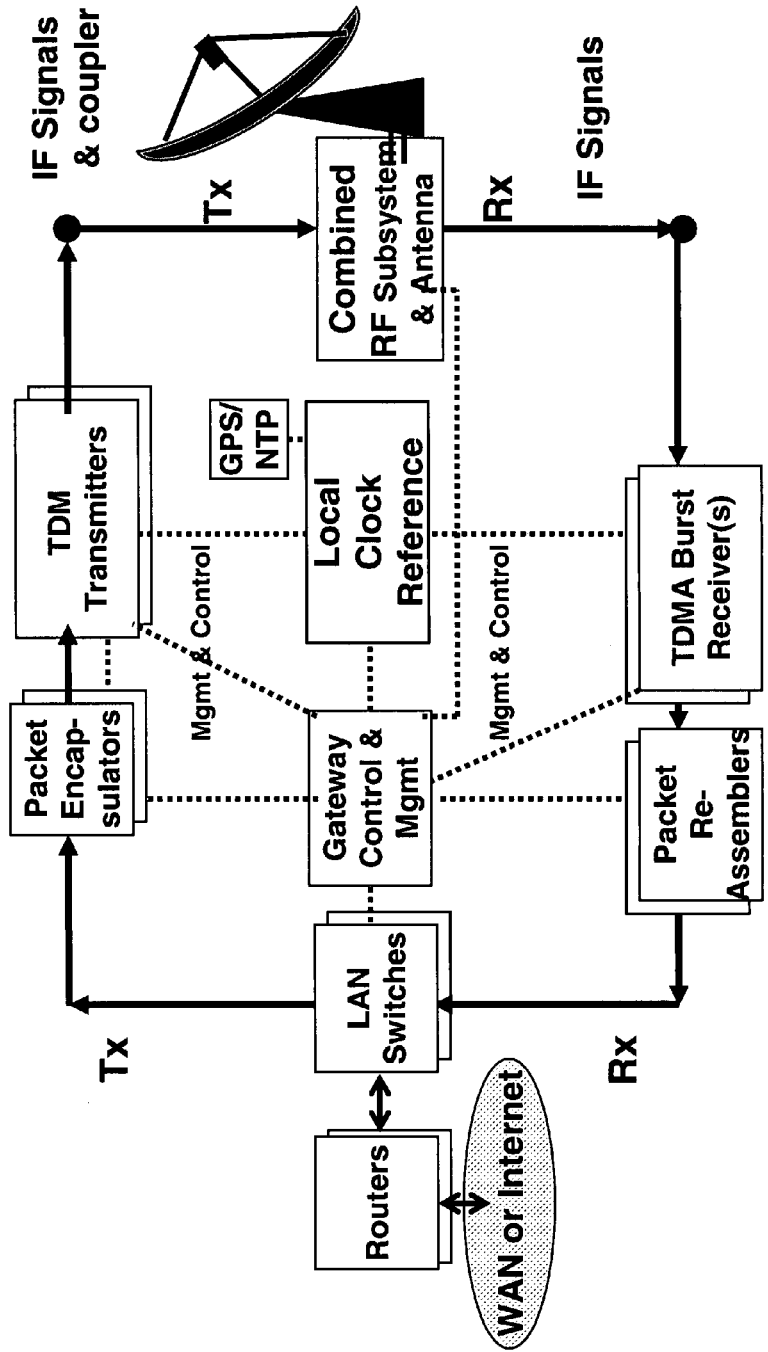
FIG. 6 illustrates a modified secondary gateway station so as not to transmit its network control signals to the slave stations (VSATs) over its TDM channel(s).

FIG. 6 shows the detailed implementation of a secondary gateway station, which is derived from the same basic components as a master station, but having all its functions related to network control particularly those pertaining to controlling the timing for the network and the slave stations' burst transmitters disabled. Thus it does not provide a network clock reference to the slave stations. Instead it has only a local clock reference (which may be based on the same equipment as a network clock reference). In addition, as noted above, it may be tied to a GPS or NTP client so that it receives a common external timing reference with the master station. The secondary gateway does not need to maintain the databases and/or tables of a master station. But most importantly is does not transmit information related to overall network management and control such as network clock references, logon responses, burst plans and timing corrections, (instead it has only gateway management and control functions). Of course, for the implementation of option "e" above it would not be necessary to disable all these network control and management functions, since each secondary gateway continues to function as a master station for changing sub-set of the slave stations.

However, as disclosed in the separate patent filing, there may be additional functions that must be attached to the secondary gateway to enable a very reliable and efficient means for implementation of option "c" above or other options above, which as noted requires TDM receivers to receive the master station's network clock reference information. (See "Enhance Secondary Gateway" section later below)

Traffic Routing Control and Information

All such secondary gateway stations may however engage in the distribution of Layer 3 routing management or policy information and supplementary network management information or information requests (e.g., via SNMP) also via Layer 3 (e.g., IP packets), which do not affect network TDMA timing or the calculation or determination of timing advances used by the slave stations. Such routing management information will inform the multi-gateway capable slave stations where to send which classes of traffic. Alternatively, the master station may be the only station allowed to send such information, if centralized routing control is desired. Additionally it is possible that each slave station (but multi-gateway capable and not) transmit all TDMA communications to all of the gateway stations, primary and secondary, that can receive them, and then each gateway station determines, under a coordinated routing policy plan among all such gateway stations, which traffic to forward to terrestrial network connections or on to other gateway stations, or on to other slave stations.

Enhanced Secondary Gateway Apparatus for Communication Among Gateways

An enhanced secondary gateway apparatus and its implementation are disclosed below, which allow for gateway-to-gateway communication.

Figure 14:
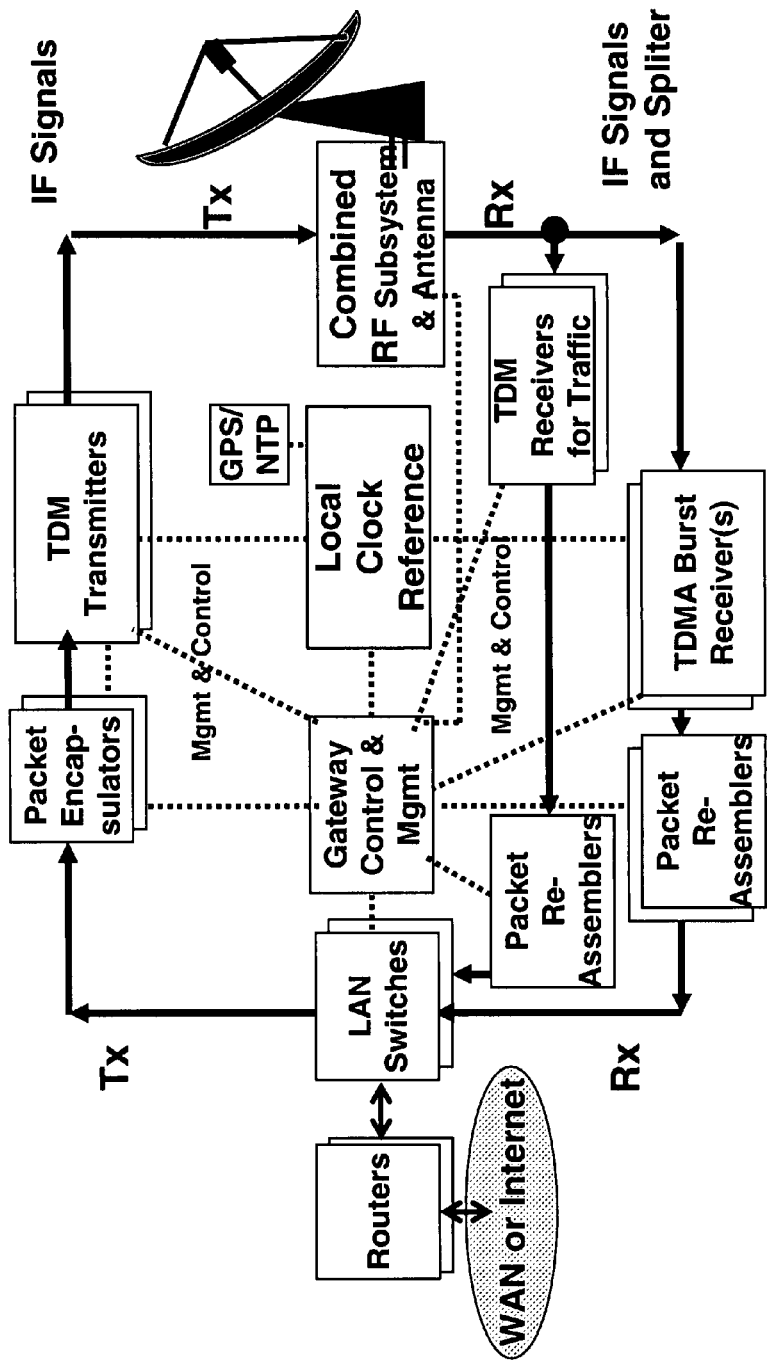
FIG. 14 shows a secondary gateway or master-capable station enhanced with multiple TDM receivers for user traffic or for special control traffic need to coordinate among secondary gateways or master capable stations, as well as a current master station.

FIG. 14 shows an embodiment of the secondary gateway station enhanced with multiple TDM receivers as are necessary to receive the TDM channel transmissions from other gateways or the master station including network timing and other network control information from the master station. This embodiment may also be used by a master station in an implementation of a multi-gateway networking system so that the master station may also receive the TDM channel transmissions from the secondary gateways in a multi-gateway network.

Enhanced Master Station Apparatus

An enhanced master station apparatus and its implementation are disclosed below, that allow the master station in a multi-gateway network to also function as a secondary gateway. In addition the enhanced master station has the ability to recognize the slave stations that are enhanced for multi-gateway operation and therefore provide the additional information they may required from the master station to discover and the supplementary TDM channels and use the other gateways in the network (as discussed earlier).

This apparatus is similar to that shown in FIG. 5 (a typical master station or primary gateway) but is further enhanced to support multiple TDM receivers for user traffic or control traffic among gateways at each such station, similar to that shown in FIG. 14 for secondary gateways, but now applied to a station that is capable of being a master. However this enhanced master station has the additional ability to disable (via software control) all its network control processes related to establishing the network clock reference for the network, distributing burst plan information, handling capacity requests, responding to logons, distributing timing corrections (large and small) and other network timing related information, and do so completely and quickly. In addition is it able to re-enable (via software control) all the same processes completely and quickly and return to its role as a master station on a preconfigured (or dynamically determined) TDM control channel that may also carry user traffic. Thus, effectively, it can switch itself between being either a master station or secondary gateway, under a higher-level control process—not currently in existence in TDM/TDMA networks—in which it engages with other secondary gateways that are also master-capable in the same sense.

This higher level control process relies on communication between all the gateways (including the current master) via one or more satellites. This communication may be establish by relying upon pre-assigned (pre-configured) TDM channel carrier frequencies and frequency bands (unique to each master-capable station) with associated modulation parameters and FEC encoding parameters, where those stations communicate with other such master-capable stations and by having each such station knowing all such assigned frequencies and transmissions parameters, as well as their own. Other mechanisms may also be used whereby this information is distributed initially (and/or edited and updated occasionally) by distribution from one preconfigured or designated "primary master station," which all the others will acknowledge as having that authority with suitable secure authentication applied to such update messages.

Over these TDM channels the various master-capable secondary gateways exchange messages to determine which station will be the current master station for the network. These same TDM channels may also be used concurrently or at appropriate times for transmissions to slave stations (both enhanced and ordinary) and either with or without network control information being distributed to those slave stations over the TDM channel, depending on whether "master station status" has been assigned to that master-capable gateway station.

CONCLUSION

Those skilled in the relevant art will appreciate that the invention can be practiced with various telecommunications or computer system configurations, including Internet appliances, hand-held devices, wearable computers, palm-top computers, cellular or mobile phones, multi-processor systems, microprocessor-based or programmable consumer electronics, set-top boxes, network PCs, mini-computers, mainframe computers and the like.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "above, "below," and words of similar import, when used in this application, shall refer to this application as a whole and not to any particular portions of this application.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the system described herein.

While specific circuitry may be employed to implement the above embodiments, aspects of the invention can be implemented in a suitable computing environment. Although not required, aspects of the invention may be implemented as computer-executable instructions, such as routines executed by a general-purpose computer, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer" are generally used interchangeably herein, and refer to any of the above devices and systems, as well as any data processor.

Aspects of the invention can be embodied in a special purpose computer or data processor that is specifically programmed, configured, or constructed to perform one or more of the processes explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

Also, while processes or blocks are at times shown as being performed in series, these processes or blocks may instead be performed in parallel, or may be performed at different times. Where the context permits, words in the above Detailed Description using the singular or plural number may also include the plural or singular number respectively.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A method of communication of a slave station with more than one gateway stations in a Time Division Multiple Access (TDMA) or Multi Frequency-Time Division Multiple Access (MF-TDMA) satellite network, wherein one gateway station is a primary gateway station, the method comprising:
   receiving information, by the slave station, from an assigned Time Division Multiplexing (TDM) channel transmitting network control information;
   joining an assigned TDMA or MF-TDMA network by employing a received information from the assigned TDM channel and logging on to an assigned primary gateway;
   getting permission and required information from the primary gateway station to communicate with at least one other gateway station, when the primary gateway station is so configured to recognize communication capabilities of the slave station, or when the slave station is so preconfigured to attempt such communication with the at least one other gateway station without the permission of the primary gateway station; and
   communicating with the at least one other gateway station by receiving from, transmitting to, or receiving from and transmitting to the at least one other gateway station,
   wherein the slave station having capability to transmit to multiple gateway stations is configured to have TDMA burst transmitters of the slave station aligned with TDMA burst receivers at the other gateway station by employing a Global Positioning System (GPS) timing reference and a Network Time Protocol client such that the other gateway station is able to link its local timing reference equipment closely to the network clock reference timing of the primary gateway station.

2. A method of communication of a slave station with more than one gateway stations in a Time Division Multiple Access (TDMA) or Multi Frequency-Time Division Multiple Access (MF-TDMA) satellite network, wherein one gateway station is a primary gateway station, the method comprising:
   receiving information, by the slave station, from an assigned Time Division Multiplexing (TDM) channel transmitting network control information;
   joining an assigned TDMA or MF-TDMA network by employing a received information from the assigned TDM channel and logging on to an assigned primary gateway;
   getting permission and required information from the primary gateway station to communicate with at least one other gateway station, when the primary gateway station is so configured to recognize communication capabilities of the slave station, or when the slave station is so preconfigured to attempt such communication with the at least one other gateway station without the permission of the primary gateway station; and
   communicating with the at least one other gateway station by receiving from, transmitting to, or receiving from and transmitting to the at least one other gateway station,
   wherein accurate and frequently updated position information, including longitude, latitude and altitude, about the location of the slave station, the location of a satellite, the location of the primary gateway station, and the location of the at least one other gateway station are used to determine constantly changing distances between the satellite, the slave station and the primary gateway stations and derive accurate estimates of time-of-flight differences for electromagnetic carrier frequencies used by the assigned TDMA channel in the TDMA or MF-TDMA satellite network and compensate for the time-of-flight differences.

3. A slave station in a Time Division Multiple Access (TDMA) or Multi Frequency-Time Division Multiple Access (MF-TDMA) satellite network with more than one gateway stations wherein one gateway station in the network is a primary gateway station, the slave station comprising:
   means for receiving information from an assigned Time Division Multiplexing (TDM) channel transmitting network control information;
   means for joining an assigned TDMA or MF-TDMA network by employing the received information from the assigned TDM channel and logging on to an assigned primary gateway;
   means for getting permission and required information from the primary gateway station to communicate with at least one other gateway station, when the primary gateway station is so configured to recognize communication capabilities of the slave station, or when the slave station is so preconfigured to attempt such communication with the at least one other gateway station without permission of the primary gateway station; and
   means for communicating with the at least one other gateway station by receiving from, transmitting to, or receiving from and transmitting to the at least one other gateway station.

* * * * *